United States Patent [19]

Thuraisingham et al.

[11] Patent Number: 5,694,590

[45] Date of Patent: Dec. 2, 1997

[54] APPARATUS AND METHOD FOR THE DETECTION OF SECURITY VIOLATIONS IN MULTILEVEL SECURE DATABASES

[75] Inventors: Bhavani Marienne Thuraisingham, Lexington; William Rose Barlett Ford, Billerica, both of Mass.

[73] Assignee: The Mitre Corporation, Bedford, Mass.

[21] Appl. No.: 843,012

[22] Filed: Feb. 28, 1992

Related U.S. Application Data

[63] Continuation-in-part of Ser. No. 767,258, Sep. 27, 1991, Pat. No. 5,355,474, and Ser. No. 807,940, Dec. 16, 1991.

[51] Int. Cl.$^6$ .................................................. G06F 17/30
[52] U.S. Cl. ........................... 395/600; 364/DIG. 1; 364/282.1; 364/286.4; 364/286.5
[58] Field of Search .................. 395/600, 61, 55; 380/25

[56] References Cited

U.S. PATENT DOCUMENTS

| | | | |
|---|---|---|---|
| 4,868,733 | 9/1989 | Fujisawa et al. | 395/600 |
| 4,882,752 | 11/1989 | Lindeman et al. | 380/25 |
| 4,912,648 | 3/1990 | Tyler | 395/61 |
| 5,197,005 | 3/1993 | Shwartz et al. | 364/419.13 |
| 5,276,775 | 1/1994 | Meng | 395/55 |

OTHER PUBLICATIONS

Glover et al, "Multilevel Secure Databases: A New Approach", IEEE Proc of the Southeascon '91, 7–10 Apr. 1991, p. 690–694, vol. 2.

Collins et al, "Security Constraint Processing During the Update Operation in a Multilevel Secure Database Management System", Proc Serenth Annual Computer Security Applications Conference, 2–6 Dec. 1991, pp. 23–32.

Thuraisingham et al, "Secure Query Processing Using AI Techniques," Proc of the Twenty–First Annual International Conference on System Sciences,5–8 Jan. 1988, pp. 561–570.

Meadows et al, "Maintaining Correctness, Availability, and Unambiguity in Trusted Database Management Systems," Fourth Aerospace Computer Security Applications Conference, 12–16 Dec. 1988, pp. 106–110.

Irvime et al, "Architecture for an Embedded Secure Data Base Management System", Proc of the Sixth Annual Computer Security Applications Conference, 3–7 Dec 1990, pp. 125–136.

*Primary Examiner*—Thomas G. Black
*Assistant Examiner*—Wayne Amsbury
*Attorney, Agent, or Firm*—Choate, Hall & Stewart

[57] ABSTRACT

A tool for assisting an operator to detect security violations in a multilevel secure database. The database stores data classified at a plurality of security levels, where the different users of the database are cleared to different security levels and access the database through a multilevel secure database management system. Security constraints are represented in conceptual structures, rules, or frames, and operator communication with the constraint representation is provided by a user interface. An inference engine uses reasoning strategies on the security-constraint representations base to detect security violations in the database by inference.

2 Claims, 17 Drawing Sheets

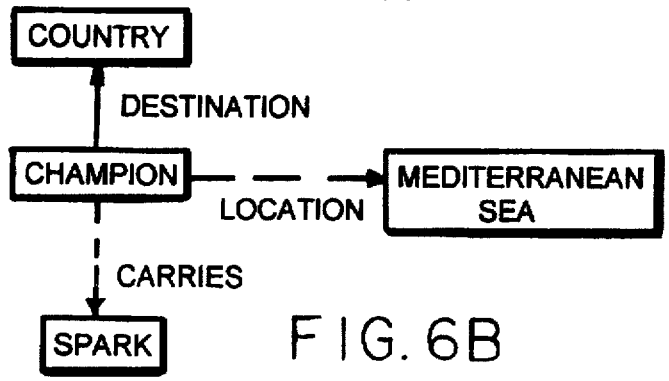
FIG. 6A
FIG. 6B
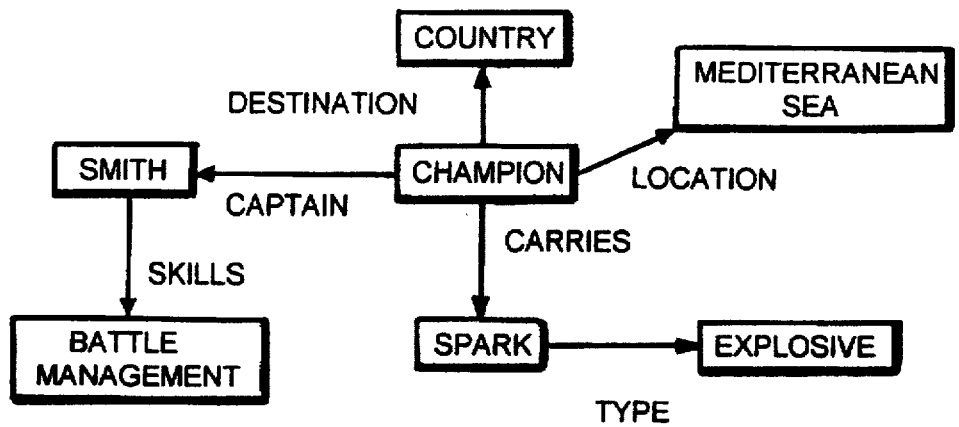
FIG. 7A
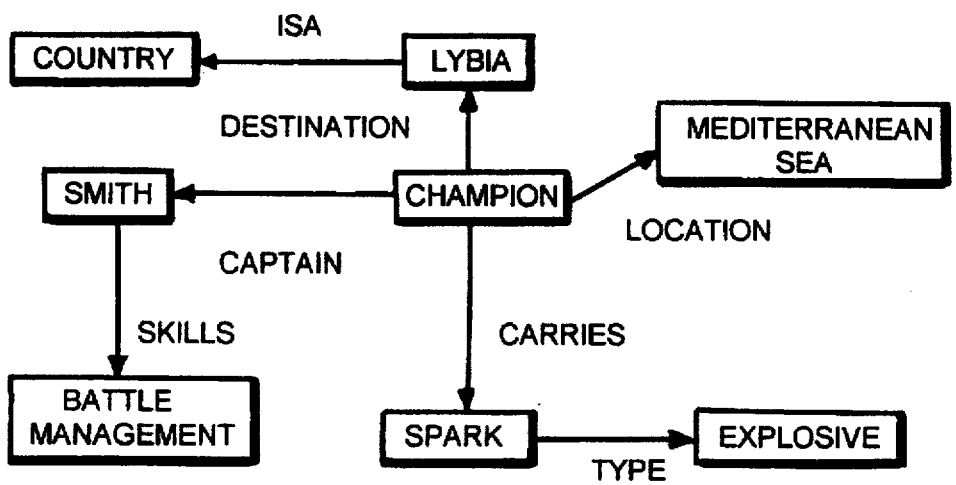
FIG. 7B

FIG. IIC x

```
Name Of Entity: CHAMPION          Name Of Entity: SMITH
Entity Type: SHIP                 Entity: Captain
Security Level: Unclassified      Security Level: Unclassified
Location: Mediterranean Sea       Skills: 20 Years Experience
Date: June 16, 1990
Destination: Greece
Carries: Passengers
Captain: Smith Name Of Entity: Smith
                                  Entity Type: Captain
                                  Security Level: Secret
                                  Skills: Battle Management Name Of Entity: CHAMPION
Entity Type: SHIP
Security Level: Secret            Name Of Entity: Spark
Location: Mediterranean Sea       Entity Type: Weapon
Date: June 16, 1990               Security Level: Secret
Destination: Libya                Weapon Type: Explosive
Carries: Spark
Captain: Smith
```

FIG. 23

```
MISSION (Champion, Iraq Crisis)    ( 0.9 )
MISSION (Ohio, Korean War)         ( 0.7 )
MISSION (Florida, Vietnam)         ( 0.8 )

FAIL (Iraq Crisis)                 ( 0.1 )
FAIL (Korean War)                  ( 0.5 )
FAIL (Vietnam)                     ( 0.9 )

SHIP (Champion, Persian Gulf)      ( 1.0 )
SHIP (Ohio, Pacific)               ( 1.0 )
SHIP (Florida, Indian)             ( 1.0 )

WAR (Persian Gulf)                 ( 0.8 )
WAR (Pacific)                      ( 0.1 )
WAR (Indian)                       ( 0.3 )
```

FIG. 24

| Security Level | Reliability | Assertions |
|---|---|---|
| Beyond-Top Secret | 1.0 | R --> S, S --> NOT P |
| Top Secret | 0.8 | S |
| Secret | 0.7 | NOT S, Q OR S |
| Confidential | 0.5 | P AND Q, NOT P, Q AND R |
| Unclassified | 0.3 | NOT Q AND R |

FIG. 25

|  |  | Justification | |
|---|---|---|---|
|  | Status | In | Out |
| 1. Champion Is A Ship | IN |  |  |
| 2. Champion Sails To Japan | IN | 1 | 3 |
| 3. Champion Is Not A Passenger Ship | OUT | 4 |  |
| 4. Champion Carries Explosives | OUT |  |  |

FIG. 26

|  |  | Justification 1 | | Justification 2 | |
|---|---|---|---|---|---|
|  | Status | IN | OUT | IN | OUT |
| 1. Champion Is A Ship | IN |  |  |  |  |
| 2. Champion Sails To Japan | OUT | 1 | 3 |  |  |
| 3. Champion Is Not A Passenger Ship | IN | 4 |  | 5 |  |
| 4. Champion Carries Explosives | OUT |  |  |  |  |
| 5. Champion Is A Warship | IN |  |  |  |  |

FIG. 27

APPARATUS AND METHOD FOR THE DETECTION OF SECURITY VIOLATIONS IN MULTILEVEL SECURE DATABASES

This is a continuation-in-part of U.S. application Ser. No. 07/767,258 filed on Sep. 27, 1991, issued as U.S. Pat. No. 5,355,474 and a continuation-in-part of U.S. application Ser. No. 07/807,940 as filed Dec. 16, 1991, now pending.

BACKGROUND OF THE INVENTION

Users of a database management system not only obtain information directly from the database, but also draw inferences from that information. The inferred knowledge may depend only on the data obtained from the database system or it may depend on some prior knowledge possessed by the user in addition to the data obtained from the database system. The inference process can be harmful if the inferred knowledge is something that the user is not authorized to acquire. This has come to be known as the inference problem in database security [Denning, D. E., and M. Morgenstern, 1986, Military Database Technology Study: AI Techniques for Security and Reliability, Final Report, SRI International, Project 1644, Menlo Park, Calif.].

The inference problem can be a particular difficulty in a multilevel operating environment. In such an environment, the users are cleared at different security levels and they access a multilevel database where the data is classified at different sensitivity levels. A multilevel secure database management system (MLS/DBMS) manages a multilevel database whose users cannot access data to which they are not authorized. However, providing a solution to the inference problem, where users issue multiple requests and infer unauthorized knowledge, is beyond the capability of current available MLS/DBMSs.

Researchers have considered at least three approaches to the inference problem. The work reported in Morgenstern, M., May 1987, "Security and Inference in Multilevel Database and Knowledge Base Systems," Proceedings of the ACM SIGMOD Conference, San Francisco; Hinke, T., 1988, "Inference Aggregation Detection in Database Management Systems," Proceedings of the IEEE Symposium on Security and Privacy, Calif.; and Thuraisingham, M. D., 1990, "Handling Association-based Constraints in Multilevel Database Management Systems," Working Paper, The MITRE Corporation (not currently in public domain) focuses on handling inferences during database design, and suggestions for database design tools are given. They attempt to handle security constraints during database design in such a way that security violations via inference cannot occur. This approach is also supported by others (see, for example, Lunt, T., May 1989, "Aggregation and Inference, Facts and Fallacies," Proceedings of the IEEE Symposium on Security and Privacy, Oakland, Calif.

In contrast, the work reported in Keefe, T. F., B. M. Thuraisingham, and W. T. Tsai, March 1989, "Secure Query Processing Strategies," IEEE Computer, Vol. 22, #3; Thuraisingham, M. D., Dec. 1987, "Security Checking in Relational Database Management Systems Augmented with Inference Engines," Computers and Security, Vol. 6, #6; Thuraisingham, M. B., Sep. 1989, "The Inference Problem in Database Security, M89–52, Vol. 3, The MITRE Corporation (not currently in public domain); Thuraisingham, M. D., March 1990, "Towards the Design of a Secure Data/Knowledge Base Management System," Data and Knowledge Engineering Journal, Vol. 5, No. 1; Ford, W. R., J. O'Keefe, and B. Thuraisingham, August 1990, Database Inference Controller: An Overview, Technical Report MTR10963 Vol. 1, The MITRE Corporation; and Collins, M., Design and Implementation of a Secure Update Processor, October 1990, Technical Report MTR10977, The MITRE Corporation focuses on handling inferences during query processing (i.e., during the process of requesting information from the database). In this approach, the query processor operates in conjunction with a logic-based inference engine. The inference engine attempts to prevent users from inferring unauthorized information. In this way, inferences can be effectively handled and thus prevented during query processing. This is effective because most users build their reservoir of knowledge from responses they receive by querying the database. It is from this reservoir of knowledge that they infer unauthorized information. Moreover, no matter how securely the database has been designed, users could eventually violate security by inference because they are continuously updating their reservoir of knowledge as the world evolves. It is not feasible to have to redesign the database continuously.

Other notable work on handling the inference problem can be found in the following. In Mazumdar, S., et al., June 1988, "Resolving the Tension Between Integrity and Security Using a Theorem Prover," Proceedings of the ACM SIGMOD Conference, Chicago, Ill., inferences are handled during transaction processing. In Rowe, N., February 1989, "Inference Security Analysis Using Resolution Theorem-Proving," Proceedings of the 5th International Conference on Data Engineering, Los Angeles, Calif., a prolog prototype for handling the inference problem is described. In Buczkowski, L. J., and E. L. Perry, February 1989, Database Inference Controller, Interim Technical Report, Ford Aerospace Corporation an expert system tool is proposed which could be used by the system security officer off-line to detect and correct logical inferences.

SUMMARY OF THE INVENTION

The invention disclosed herein is an apparatus and method for detecting security violations in a multilevel secure database during design time. The invention includes a database that stores data classified at a plurality of security levels, where different users are cleared to different security levels and access the database through a multilevel secure database management system. It also includes a knowledge base that stores security constraints for the database, and a user interface through which an operator, or system security officer (SSO), can communicate with the knowledge base. Finally, it includes an inference engine for reasoning on information in the knowledge base to detect security violations in the database by inference. In particular, the invention involves the design of two tools for assisting the SSO to detect/prevent security violations via inference. The first tool enables the representation of a multilevel application using conceptual structures and reasons about the application so that security violations can be detected. The second tool extends the first one by taking the output of the multilevel database management system into consideration in addition to the representation of the application. It also handles more sophisticated inference strategies.

In a preferred embodiment, the knowledge base stores the security constraints in conceptual structures, or specifically in semantic nets. The representations possible with the semantic nets include universal and existential conditionals. Also in preferred embodiments (tool 1), the inference engine can infer implicit information from semantic nets, can infer implicit information from the semantic nets by using auxiliary semantic nets that represent conditional statements, or can detect security violations in the database by using auxiliary semantic nets that represent security constraints. In yet another preferred embodiment of the invention conceptual structures such as conceptual graphs are also disclosed.

In a preferred embodiment, the knowledge base uses rule- or frame-based representations, and can have a knowledge manager for accessing the rule- or frame-based representations. Also in a preferred embodiment, the inference engine uses rule-based reasoning, frame-based reasoning, fuzzy reasoning, reasoning across security levels, or plausible reasoning. In another preferred embodiment (tool 2), the invention includes a conflict and contention resolution system for resolving conflict in the knowledge base in response to inquiries by the inference engine and a truth maintenance system for maintaining the consistency of the beliefs represented in the knowledge base.

BRIEF DESCRIPTIONS OF THE DRAWINGS

FIGS. 1a–1h show typical portions of multilevel semantic nets, as used in the user interface.

FIGS. 2a–2b give examples of semantic nets with ISA and AKO links.

Figure 5A:
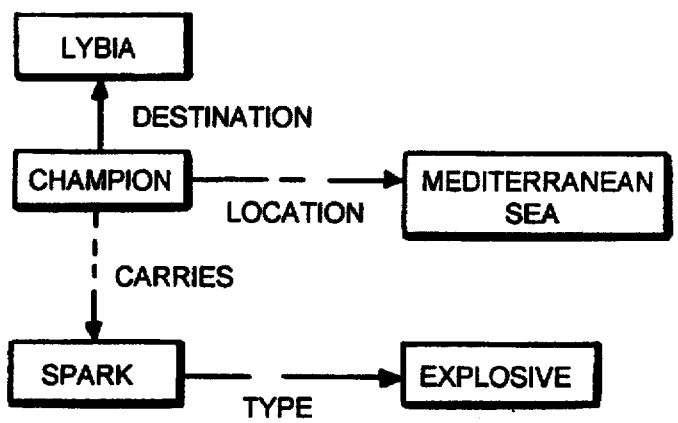
Figure 5B:
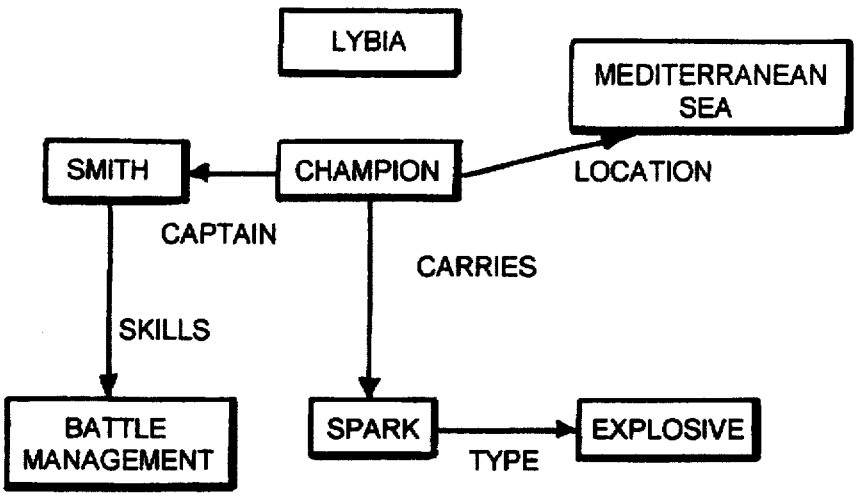
Figure 5C:
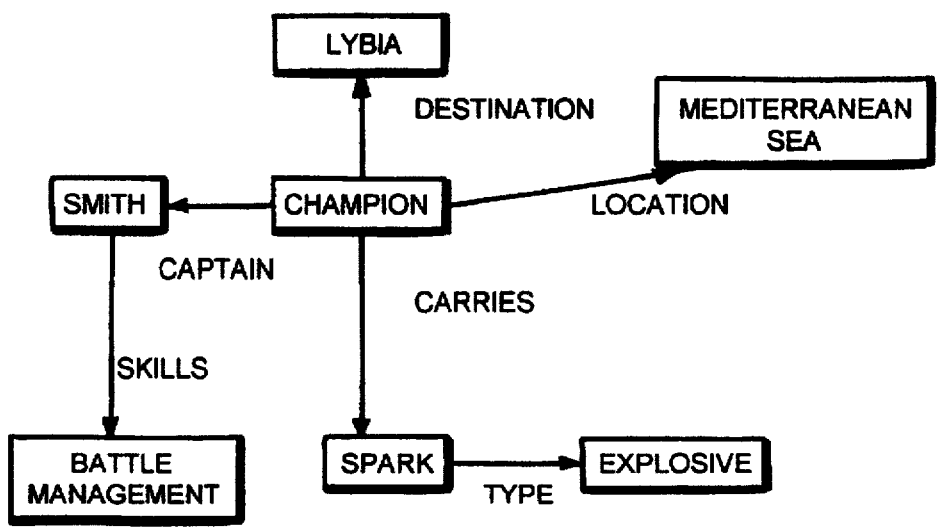

FIGS. 5a–5c demonstrate the use of auxiliary semantic nets to represent conditional statements.

FIGS. 6a–6b shows security constraints represented in auxiliary semantic nets.

FIGS. 7a–7b and 8a–8b show security violations in semantic nets.

Figure 9A:
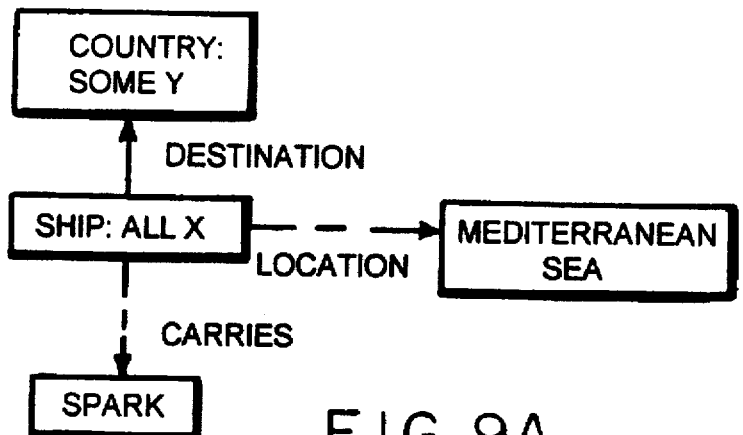
Figure 9B:
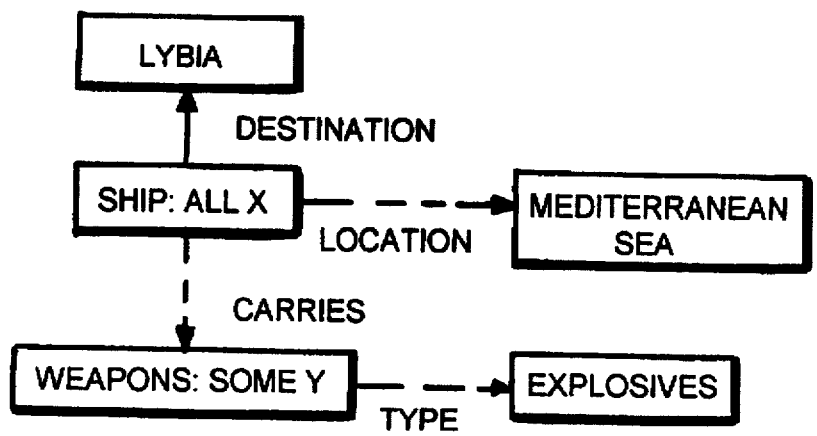

FIGS. 9a–9b illustrate the use of semantic nets to represent universal and existential conditionals.

FIGS. 10 and 11a–11c illustrate the pattern matching and binding processes for semantic nets.

Figure 12:
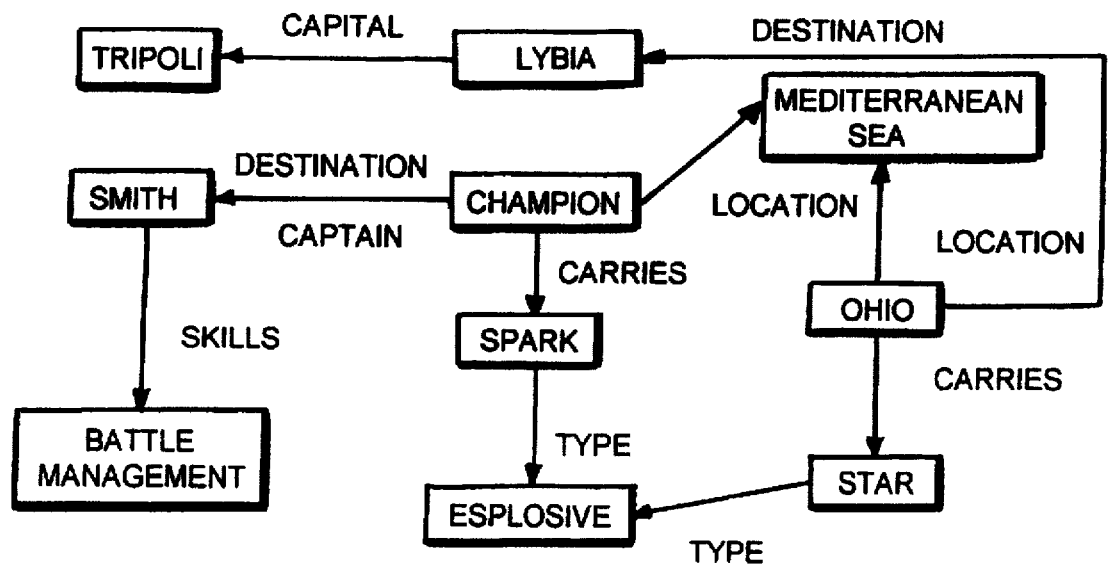
Figure 12:

FIG. 12 is a schematic diagram illustrating negative statements.

Figure 13A:
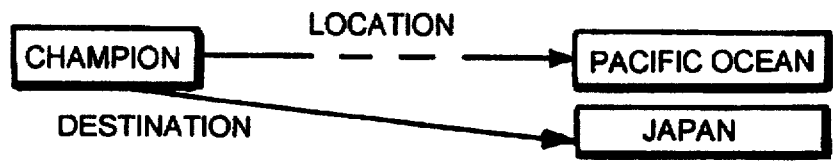

FIGS. 13a, b, c, d and e, are schematic diagrams illustrating the refutation process.

Figure 14:
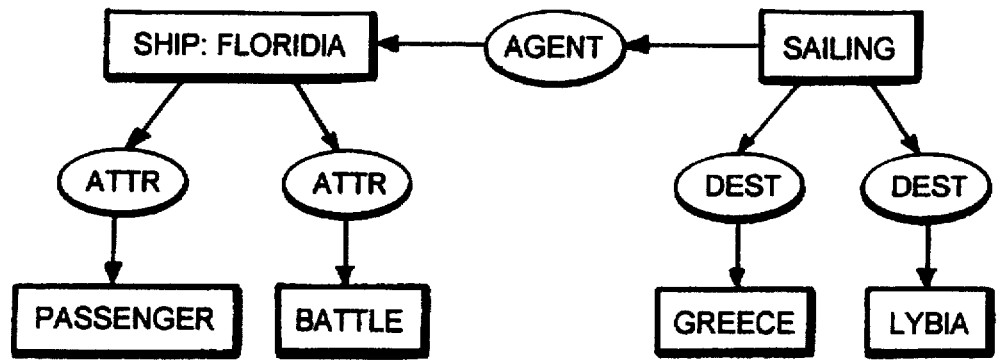

FIG. 14 is a graphical illustration of multilevel conceptual graphs.

Figure 15:
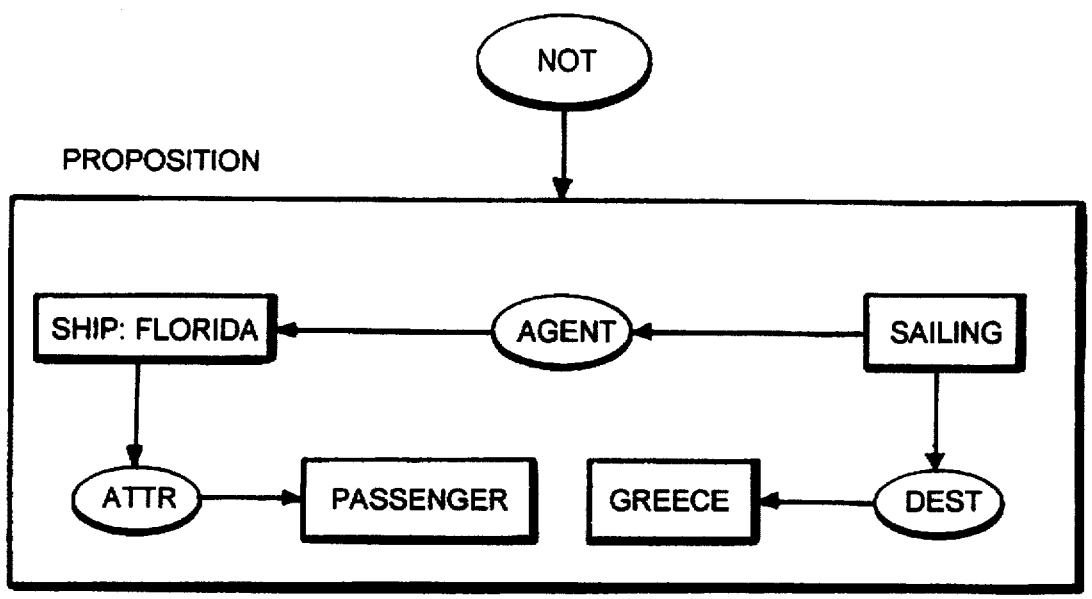

FIG. 15 is a schematic illustration for negative statements.

Figure 16:
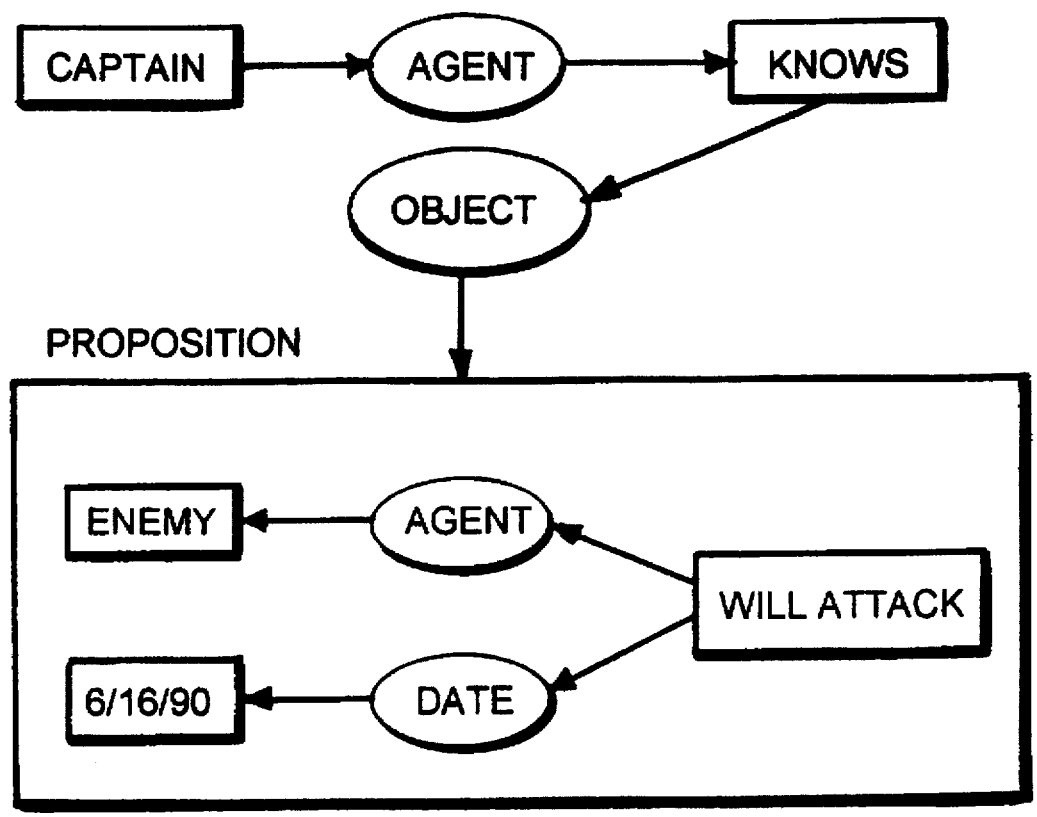

FIG. 16 is a graphical illustration of complex assertions.

Figure 17:
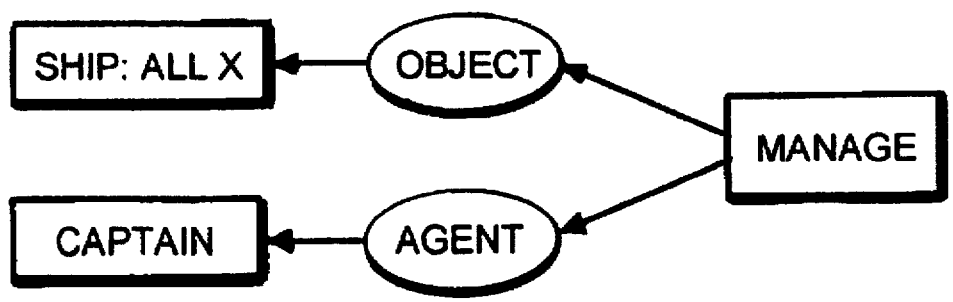

FIG. 17 is a schematic illustration of a universal statement.

FIGS. 18a–18e is a schematic illustration of applying deduction rules.

Figure 19:
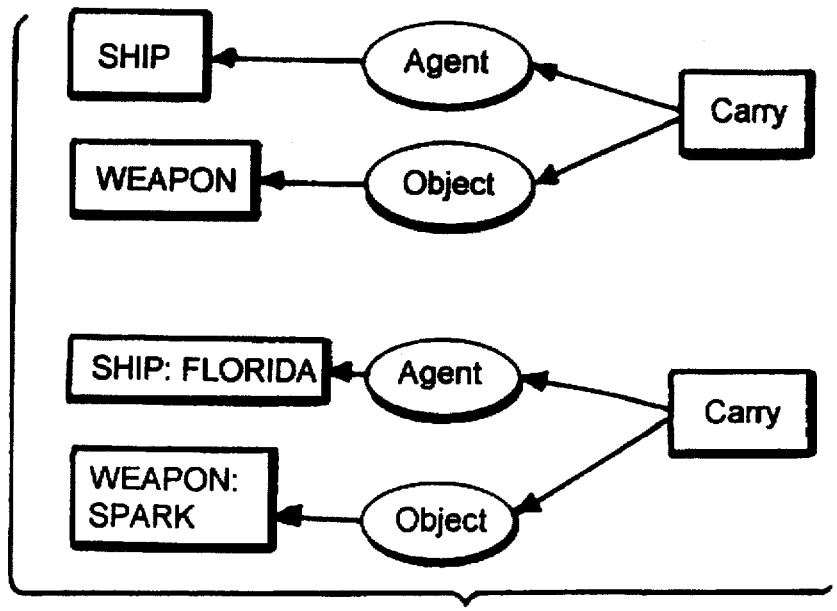

FIG. 19 is a schematic illustration relating to violating security constraints.

Figure 20:
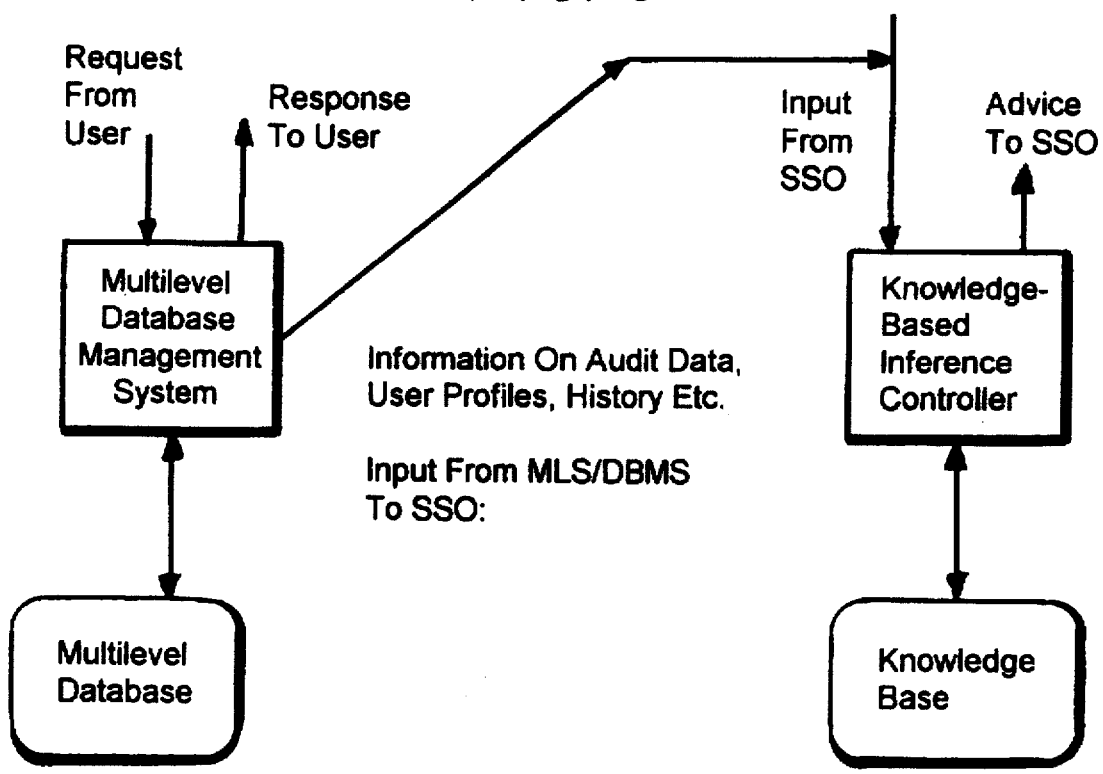

FIG. 20 is a schematic diagram of the communication paths between the database and its multilevel database management system and the expert inference controller and its knowledge base.

Figure 21:
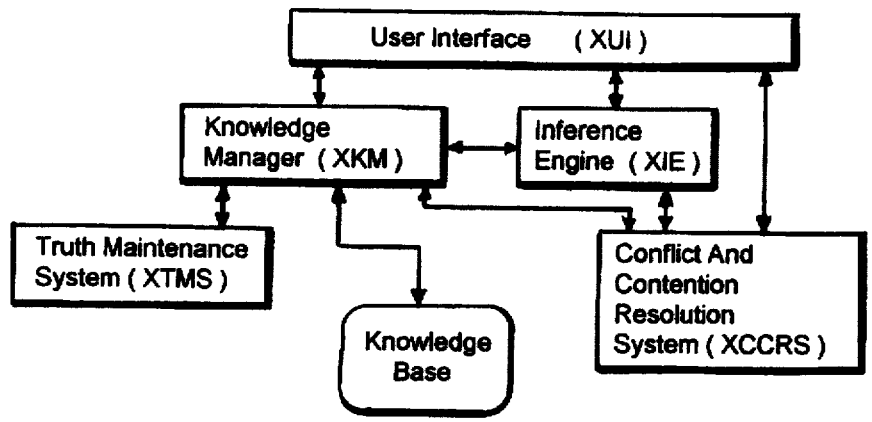

FIG. 21 is a schematic depiction of the communication paths among the major modules of the expert inference controller.

Figure 22:
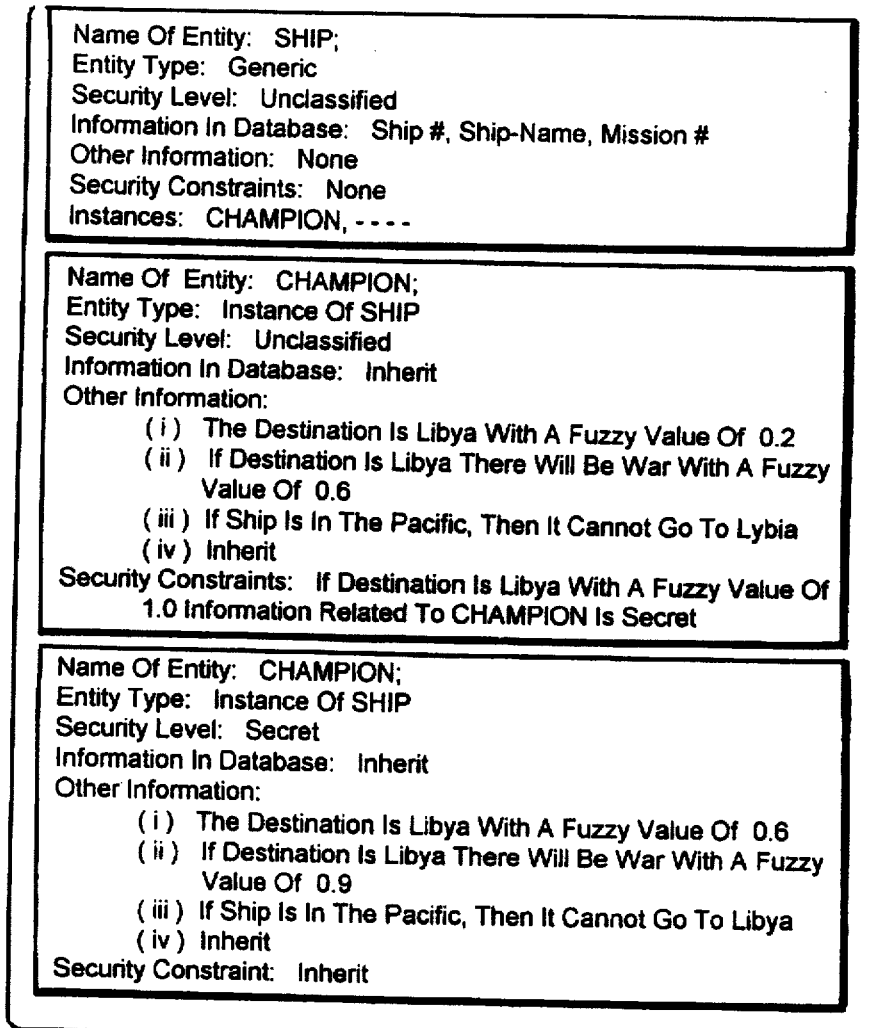

FIG. 22 gives three examples of frame-based representations for the knowledge base.

Figure 3:
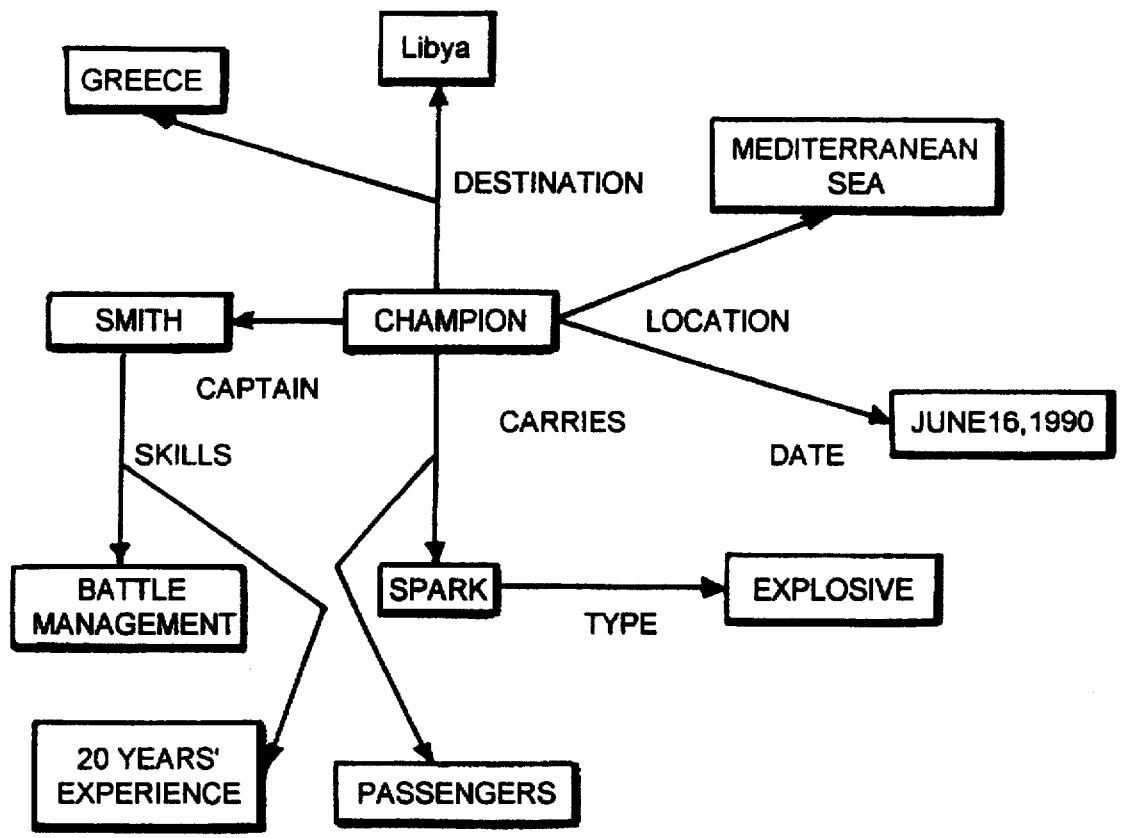
FIG. 3 shows a typical multilevel semantic net.

FIG. 23 shows the semantic net of FIG. 3 represented as knowledge frames.

FIG. 24 gives an example of a fuzzy knowledge base.

FIG. 25 gives examples of a knowledge base for plausible reasoning.

FIGS. 26 and 27 show examples of support list justifications for use in the truth maintenance system.

DESCRIPTION OF THE PREFERRED EMBODIMENT

The invention disclosed herein are tools for assisting an operator, or system security officer (SSO), in detecting violations of security constraints in multilevel secure database management systems. In such systems users can access only information at levels for which they are authorized. For example, in a two-level system where the levels were defined as Unclassified and Secret, a user authorized to access only Unclassified information would be denied access to Secret information. However, a problem arises when sufficient information is available at the Unclassified level to allow the user to infer information at the Secret level. This problem is known as the inference problem.

The invention solves the inference problem by providing an inference engine to detect violations of security constraints. The inference engine is equipped with reasoning strategies to determine, using information in the database and additional information in a knowledge base regarding security constraints, what additional information can be inferred from the information stored directly in the database.

One aspect of the invention described below uses a knowledge base of semantic nets to detect security violations. It discloses the derivation of implicit information from the semantic nets representing the application information, both directly and using auxiliary semantic nets. When security constraints are represented in auxiliary semantic nets, the inference engine can be used to detect security violations.

A second aspect of the invention is an expert inference controller, or XINCON (for eXpert INference CONtroller), for detection of security violations. XINCON is an apparatus and method able to deduce unauthorized inferences that users could make via logical deduction, certain types of non-classification logical deduction, and analogical reasoning. XINCON is also extendable so that in the future it could reason about additional inference strategies such as inductive and heuristic reasoning.

Conceptual Structures and the Inference Problem

The particular form of the conceptual structure used in the preferred embodiment is the semantic net. A semantic net is a collection of nodes connected via links. The nodes represent concepts, entities, etc. and the links represent relationships between them. Our treatment of semantic nets is influenced by the work reported in Richards, T., 1989, Clausal Form Logic: An Introduction to the Logic of Computer Reasoning, Sydney, Australia: Addison Wesley. An example of a semantic net is shown in FIG. 1 (the different versions of the net in FIG. 1 represent different multilevel nets, which are discussed below). The net in FIG. 1 states that ships carry weapons.

In addition to links of the kind shown in FIG. 1, which represent special relationships, a semantic net also has two standard links: ISA links and AKO links. An ISA link is used to specify that a particular individual belongs to a particular group. FIG. 2a shows an ISA link where CHAMPION is defined to be a particular ship. An AKO link defines a subset of a collection of individuals. FIG. 2b defines the collection of ships to be a subset of a collection of water vehicles.

Since the application under consideration is multilevel, standard semantic nets cannot represent it, and a multilevel semantic net is required. A multilevel semantic net (MSN) is a semantic net with nodes and links classified at different security levels. FIGS. 1a–1h show some simple multilevel semantic nets. We assume that there are only two security levels, Unclassified and Secret (though the invention can easily be extended to support multiple security levels). The darkened shapes and lines are assumed to be Secret.

Figure 1A:
Figure 1B:
Figure 1C:
Figure 1D:
Figure 1E:
Figure 1F:
Figure 1G:
Figure 1H:
Figure 2:
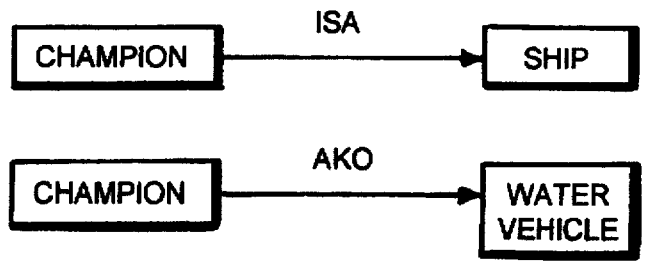

In FIG. 1a, both the node and link are Unclassified. That is, the fact that ships carry weapons can be seen by all. In FIG. 1b, the concepts SHIPS and WEAPONS can be seen by all. However the fact that ships carry weapons cannot be seen by Unclassified users as the relationship is classified Secret. In FIG. 1c, the Unclassified users know that something carries weapons. But they do not know that ships carry weapons. In FIG. 1d, the Unclassified users know that ships carry something. They do not know what is carried by the ships. In FIG. 1e, the Unclassified users know that something is carried by something else. They do not know anything about ships and weapons. In FIG. 1f, Unclassified users know only about ships. In FIG. 1g, Unclassified users know only about weapons. In FIG. 1h, nothing is visible to the Unclassified users.

We can see that in multilevel nets certain information is polyinstantiated. Polyinstantiation occurs when users at different security levels have different view of the same thing in the real world. FIG. 3 shows a multilevel semantic net. The Unclassified interpretation of this figure is as follows. CHAMPION carries passengers. Throughout this specification we assume that CHAMPION, OHIO, and FLORIDA are ships and SPARK and STAR are weapons. Its captain is Smith who has 20 years' experience. The ship is located in the Mediterranean Sea on 16 Jun. 1990. Its destination is Greece. The Secret interpretation is as follows: CHAMPION carries SPARK which is an explosive. Its captain is Smith who has battle management experience. The ship is located in the Mediterranean Sea on 16 Jun. 1990. Its destination is Libya. (In this example we assume that Libya, SPARK, Explosive, and Battle Management are also Secret. We assumed this only to show that concepts as well as links could be classified. In reality, some of this information could be public knowledge. What is important is to classify the non-public knowledge appropriately.)

Implicit Information

Most real-world applications deal with very large quantities of information. Therefore, capturing all of the information in a semantic net would make the net extremely complex. What we need is a minimal semantic net with a powerful set of reasoning strategies so that other information can be deduced. The information that is deduced is implicit information. For a multilevel application it should be ensured that the level of the implicit information that can be deduced by a user at Level L should be dominated by L.

Some rules for deducing implicit information are the following:

Rule A3: If X AKO Y and Y AKO Z then X AKO Z. The level of the AKO link from X to Z is the least upper bound of the levels of AKO links from X to Y and Y to Z.

Figure 4A:
FIGS. 4a–4e show semantic nets from which implicit information can be deduced.

FIG. 4a illustrates an example. The semantic net has SHIP AKO WATER-VEHICLE and WATER-VEHICLE AKO VEHICLE, and the AKO link from SHIP to WATER-VEHICLE is Secret. Then at the Secret level one can conclude that SHIP AKO VEHICLE.

Rule A4: If X AKO Y and Y has relationship R with Z, then X has relationship R with Z. The level of the relationship R that X has with Z is the least upper bound of the levels of the AKO link from X to Y and the relationship R from Y to Z.

Figure 4B:
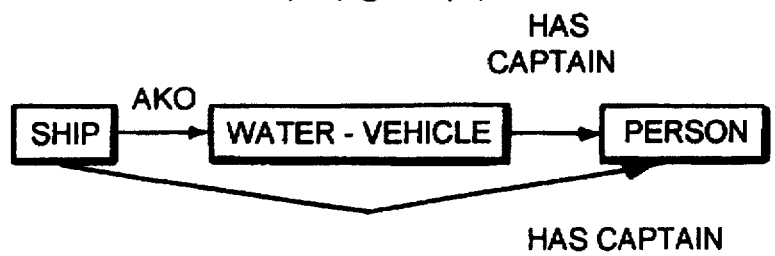

FIG. 4b illustrates an example. The semantic net has SHIP AKO WATER-VEHICLE and WATER-VEHICLE has captain PERSON. Then SHIP has captain PERSON.

Rule A5: If X ISA Y and Y AKO Z, then X ISA Z. The level of the ISA link from X to Z is the least upper bound of the levels of the AKO link from Y to Z and the ISA from X to Y.

Figure 4C:
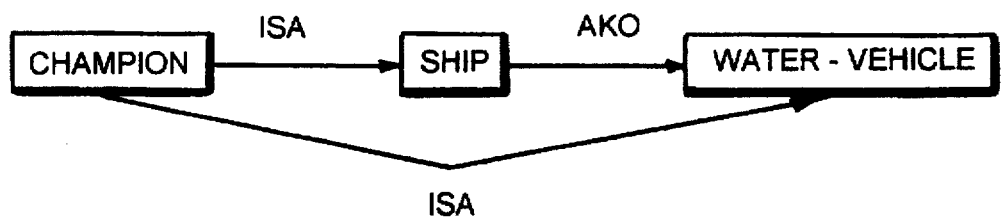

FIG. 4c illustrates an example. CHAMPION ISA SHIP. This link is Secret. SHIP AKO WATER-VEHICLE. Therefore, there is a Secret ISA link from CHAMPION to WATER-VEHICLE.

Rule A6: If X ISA Y and Y has relationship R with Z, then X has relationship R with Z. The level of the relationship R that X has with Z is the least upper bound of the levels of AKO link from X to Y and the relationship R from Y to Z.

Figure 4D:
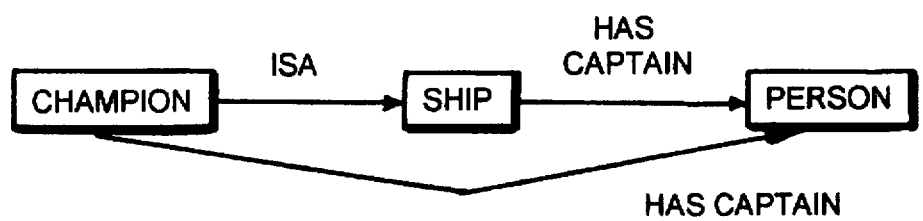

FIG. 4d illustrates an example. The semantic net has CHAMPION ISA SHIP. SHIP has captain PERSON. Therefore, CHAMPION has captain PERSON.

Rule A7: If X ISA Y and Z has relationship R with X, then Z has relationship R with Y. The level of the relationship R that Z has with Y is the least upper bound of the levels of ISA link from X to Y and the relationship R from Z to X.

Figure 4E:
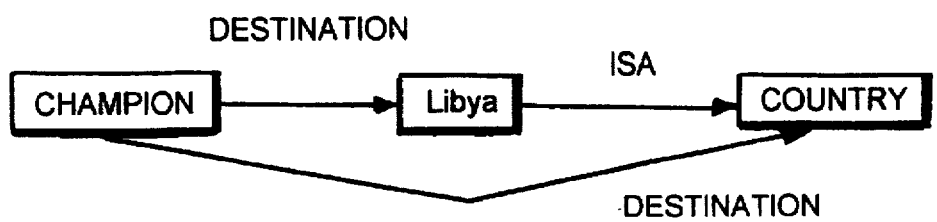

FIG. 4e illustrates an example. The semantic net has Libya ISA COUNTRY. The ship CHAMPION's destination is Libya. Therefore, the destination of CHAMPION is a country.

Conditional Statements and Auxiliary Nets Conditional statements are of the form: A if B1 and B2 and B3 and ... Bn where B1, B2, ... Bn are the antecedents and A is the consequent.

Note that conditional statements are clauses of a logic program [KOWA79]. Such a conditional statement can be represented by auxiliary semantic sets. We illustrate the essential points with an example.

Consider the following conditional statement:

CHAMPION's destination is Libya, if it is located in the Mediterranean, and it carries SPARK, which is an explosive.

The conditional statement is represented by the auxiliary net shown on FIG. 5a. That is, the conditions are represented by dotted lines (The dotted lines are darkened if they represent Secret relationships.) and the conclusion is represented by solid lines. The transfer rule is applied in order to process conditional statements. The following is the transfer rule:

Rule A8 (Transfer Rule): If all the dotted lines in the auxiliary net are shown as solid lines in a main multilevel semantic net, and the level of each solid line of the main net dominates the level of the corresponding dotted line in the auxiliary net, then the solid line in the auxiliary net is drawn as a solid line in the main net. The security level of the line drawn is the least upper bound of the levels of all the lines in the auxiliary net and the levels of all the corresponding solid lines already in the main net.

FIG. 5b shows that the dotted lines in the auxiliary net occur as solid lines in the multilevel semantic net. FIG. 5c shows that the solid line in the auxiliary net is added to the multilevel net at the appropriate security level.

Enforcing Security Constraints

Security constraints are rules which assign security levels to the data. We represent security constraints by what we call "constraint nets." A constraint net is a semantic net or an auxiliary semantic net which specifies only constraints.

However, while semantic nets are used in general to represent application information, constraint semantic nets are used to represent the security constraints so that any security violation in the application can be detected. Similarly, while auxiliary semantic nets are used to derive implicit information, security constraints which are represented as auxiliary semantic nets are used to detect security violations. Therefore, we differentiate between ordinary auxiliary nets and constraint auxiliary nets. One can think of ordinary auxiliary nets as integrity constraints which are treated as derivation rules. That is, they are used to deduce new information from existing information. Constraint nets are used neither as derivation rules nor as integrity rules. Instead, they are used to determine whether the semantic net which includes the explicit as well as the derived information has any security flaws. (For a discussion on integrity and derivation rules, we refer to Gallaire, H. and Minker, J., 1978, Logic and Databases, Plenum Press.) FIG. 6a classifies the fact that CHAMPION carries anything at the Secret level. FIG. 6b shows a constraint which classifies the destination country of CHAMPION at the Secret Level if CHAMPION is located in the Mediterranean and it carries SPARK.

Security violations occur (either directly or indirectly) if the constraint net contradicts the multilevel semantic net which represents the application (either directly or indirectly). The semantic net of FIG. 7a violates both constraints of FIGS. 6a–6b directly. That is, in FIG. 7a, the fact that CHAMPION carries something is not Secret. This directly violates the constraint of FIG. 6a. Also, in FIG. 7a, CHAMPION is located in the Mediterranean and it carries SPARK. However, its destination country is Unclassified. This directly violates the constraint of FIG. 6b.

Constraints can also be violated indirectly. This occurs when the implicit information that can be inferred contradicts the security constraints. FIG. 7b shows how the security constraint of FIG. 6b is violated indirectly. Here, CHAMPION carries SPARK and it is located in the Mediterranean. Its destination country Libya is Unclassified. Since Libya is a country, by rule A7, the destination Libya of CHAMPION must be secret. Therefore the constraint of FIG. 6b is violated indirectly.

Figure 8A:
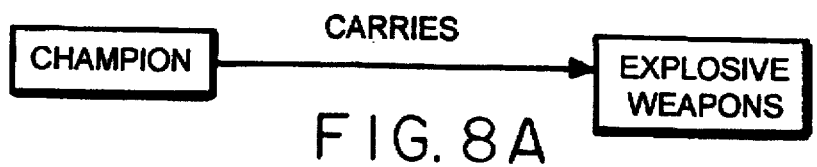
Figure 8B:
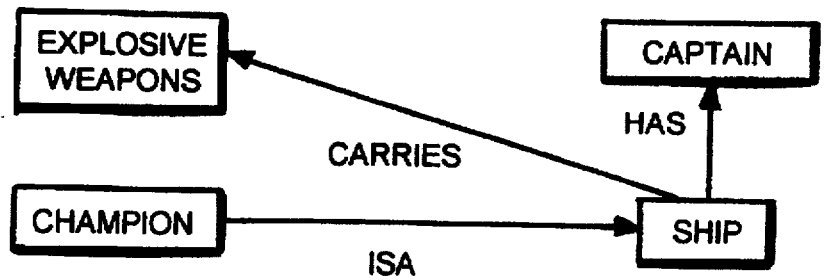

Another example of indirect constraint violation is shown in FIGS. 8a–8b. Consider the constraint of FIG. 8a. This constraint classifies at the Secret level the fact that CHAMPION carries explosive weapons. Consider the semantic net of FIG. 8b. In this net, SHIP carries explosive weapons. This means that all ships carry explosive weapons. It is also specified that CHAMPION ISA Ship. Then applying rule A4 one can infer that CHAMPION carries explosive weapons. But the "CARRIES" relationship between CHAMPION and EXPLOSIVE WEAPONS is Unclassified. This violates the constraint of FIG. 8a. Note that in this example implicit information that can be inferred from the information in the multilevel semantic net violates the security constraints.

Universal and Existential Conditionals

Consider the security constraint illustrated in FIG. 6b. This constraint specifies that whenever CHAMPION is in the Mediterranean and it carries SPARK, its destination country is secret. Suppose we want the same constraint for any ship. This means that for every ship in the list of U.S. Navy ships, we just have an explicit constraint. It is not practical to have a constraint for each ship. What we need is a way to specify that for every ship X, if X is in the Mediterranean and it carries SPARK, then its destination is Secret. One way to specify this is to use the type of a ship, which is SHIP, instead of the name of a particular ship. Suppose, instead, we want to classify the fact that whenever a ship carries one or more weapons, then its destination must be kept Secret. In this case, if we use the type of weapons, which is WEAPONS, then there is ambiguity as to whether we mean all weapons or at least one weapon. In order to unambiguously represent information such as "all ships" and "some weapons," we need to introduce the notion of universal and existential conditionals.

A conditional is an auxiliary semantic net. A universal conditional is a conditional with only universally quantified variables. An existential conditional is one with only existentially quantified variables. A mixed conditional is one with both types of variables. Universal and existential conditionals are powerful as they can handle vast quantities of information. In order to treat universal and existential conditionals we need to handle variables. The constraint semantic net for specifying a constraint using universal and existential conditionals is shown in FIG. 9a. By "SHIP: ALL X" and "COUNTRY: SOME Y" we mean "all ships X" and "some country Y" respectively. This constraint states that for all X, if Y is in the Mediterranean and it carries SPARK, then its destination country is Secret.

Conditionals are useful for not only specifying the constraints, but also for stating information in any auxiliary net. For example, suppose any ship which carries an explosive weapon located in the Mediterranean is destined for Libya. In addition, we assume that the destination is Secret. the auxiliary net for specifying the universal conditional is shown in FIG. 9b. Note that this net uses universal as well as existential conditionals. This net states that if for all ships X, if X is in the Mediterranean and it carries some weapon which is an explosive, then its destination is Libya. Furthermore, the destination is Secret.

The proof theory for variables is pattern matching and binding. We formally define pattern matching and binding as follows:

Rule A9 (Pattern Matching Rule):
Let A and B be subnets to two multilevel semantic nets. Note that a subnet is any subset (nodes and links) of a semantic net. Subnets are also called vectors. A matches B if the following are satisfied:
(i) The links are labelled the same and have the same security levels.
(ii) If a node in A is labelled with a constant, then the corresponding node in B is labelled with the same term, and the two nodes have the same security levels. A term is a variable or a constant.
(iii) If two nodes in A are labelled with the same variable, then the corresponding two nodes in B are labelled with the same constant. Further, the security levels of the corresponding nodes in the two nets are the same.

Figure 10:
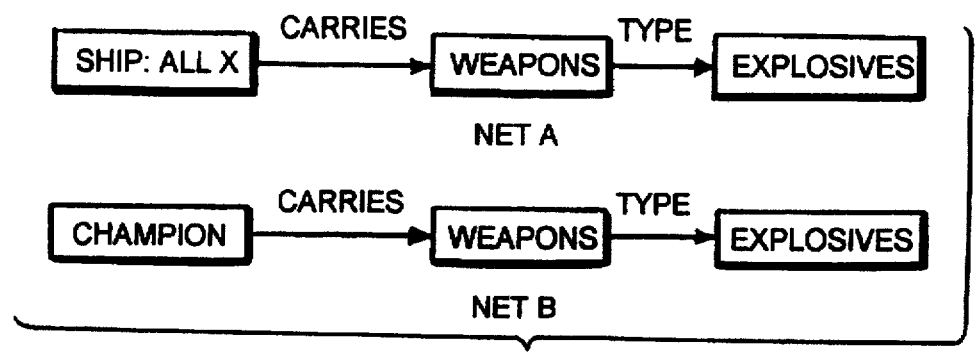

FIG. 10 shows two vectors, A and B, where A matches B.

Rule A10 (Binding Rule): If a vector A matches with vector B, then for any variable x in A, the corresponding node in B which matches with x is called the binding of x.

In FIG. 10, the binding for the variable x in A is the constant CHAMPION in B.

Figure 11A:
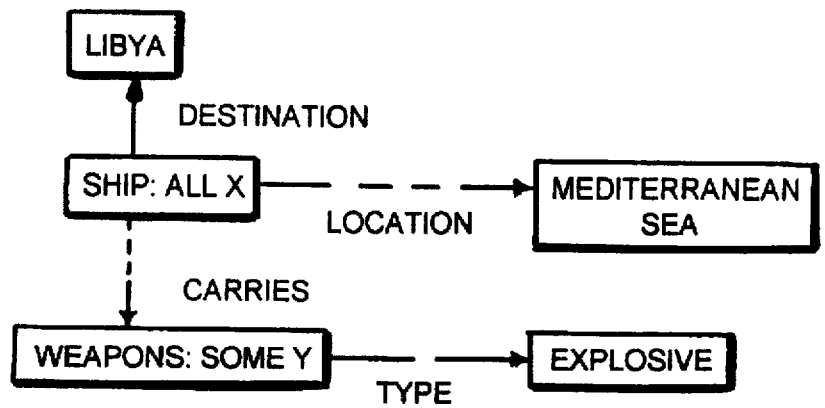
Figure 11B:
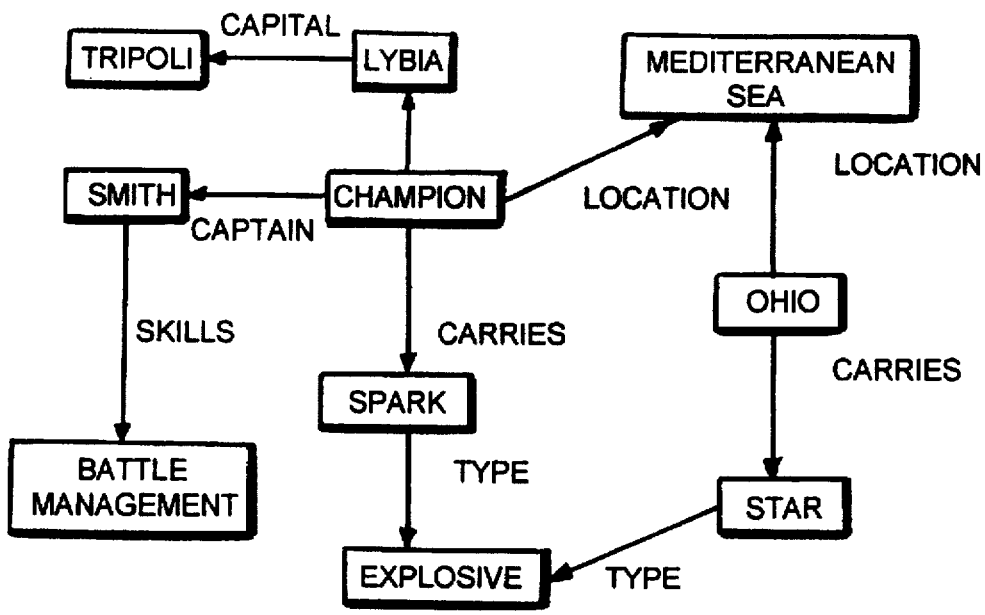

We now illustrate the pattern matching and binding process with an example. Consider the auxiliary net of FIG. 11a. Also, consider the semantic net shown in FIG. 11b. We can bind CHAMPION and OHIO with the variable X and SPARK, and STAR with the variable Y. The constant Explosive and the links LOCATION, CARRIES, and TYPE are matched in both nets. Therefore, applying the transfer rule, we can add Secret links from CHAMPION to Libya and OHIO to Libya. This is shown in FIG. 11c.

Refutations

The proof theory that we have described can be used by an SSO in order to analyze the application. However, if we want to automate the analysis process, then a theory based on the refutation procedure would be more efficient. Refutation procedures have been developed for semantic nets. We describe how such a procedure could be adapted for multilevel semantic nets.

In order to develop a refuation procedure for multilevel semantic nets, we need to first introduce the notion of negation. That is there has to be a way of specifying negative information (or statements).

Negative statements can be assumed by default. This is the closed world assumption where anything that is not specified in the semantic net is assumed to be false. On the other hand, negative statements can also be explicitly specified. When proofs are automated, negative statements have to be explicitly specified. For example, a concept, event, or relationship can have different values at different security levels. We assumed that if in the Unclassified world the ship's destination is Greece then in the Secret world it is assumed that the ship's destination is Libya. That is, the SSO could make such inferences when given conflicting statements. However, if the proofs are automated, then the negation of the fact that the ship is going to Greece has to be specified. FIG. 12 shows how such a negative statement can be specified by an auxiliary net.

Figure 13B:
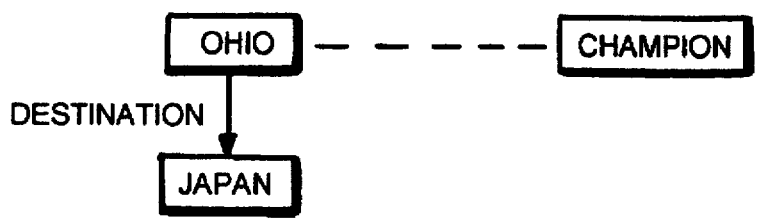
Figure 13C:
Figure 13D:
Figure 13E:

We now illustrate the refutation procedure with an example. Consider the auxiliary net, main net, and the auxiliary net for the negative statement shown in FIGS. 13a, 13b, and 13c respectively. The auxiliary net of FIG. 13a states that if CHAMPION is located in the Pacific Ocean, then at the Secret level one can conclude that its destination is Japan. The main net shown in FIG. 13b states that the destination of Ohio is Japan. It does not give any information on CHAMPION except its name. The negative statement shown in FIG. 13c states that at the Secret level the destination of CHAMPION is not Japan. Suppose at the Secret level we want to show that CHAMPION is not in the Pacific. The we must add its negation (which is "CHAMPION is in the Pacific") to the main net. This is shown in FIG. 13d. The applying the transfer rule, we can conclude that CHAMPION is going to Japan. This is shown in FIG. 13e. This is a contradiction because of the negative statement of FIG. 13c. Therefore the assumption that CHAMPION is in the Pacific is false. Note that we cannot arrive at this contradiction at the Unclassified level. This is because at the Unclassified level we cannot apply the transfer rule, nor can we assume that the negative statement is true.

Conceptual Graphs

A conceptual graph is a graph-based notation developed by Sowa [Sowa, J., 1984, Conceptual Structures: Information Processing in Minds and Machines, Reading, M.A.: Addison Wesley] for representing and reasoning about knowledge. It evolved from other graph-based representation schemes, such as semantic nets. It has been found to be more flexible, more extensive, and more precisely defined than its predecessors [Ringland, G. A. and D. A. Duda, 1988, Approaches to Knowledge Representation: An Introduction, Research Studies Ltd. Letchworth, England: New York, John Wiley & Sons]. It has the full representational power of first-order logic. Further, its mapping onto logic is precisely defined. It has also been argued that conceptual graphs can be naturally extended to represent modality and time. Due to all these advantages, Clancey [Clancey, W. J., 1985, "Review of Conceptual Structures in Information Processing in Mind and Machine," Artificial Intelligence, Vol. 27, #1, pp. 113–124]writes the following:

Every AI and cognitive science researcher should study the conceptual graph notation and understand its foundation in logic, database, and knowledge representation research."

Although much of the development of conceptual graphs has evolved from semantic nets, their origins date back to the work of Pierce on graph structures carried out during the last century. The basic constructs of conceptual graphs are the notions of concepts and relationships between concepts. A concept could be any entity, action, or event. Concepts are related to one another by relationships. Concepts are represented as nodes and relationships as links. Each concept is an instantiation of a concept type. The concept types are ordered by the relation "<." For example, the concept types PERSON and MAN are ordered by MAN<PERSON. This means that every man is also a person. An instantiation of the type MAN is "John." The relationships are also instantiations of RELATIONSHIP TYPES. For example, if AGENT is a relationship type it can be instantiated as John is the agent of drinking. This means that John is drinking.

Our interest in conceptual graphs is to be able to represent a multilevel application using these graphs and be able to reason about the multilevel application. We have found that semantic nets were quite useful for this purpose. Furthermore, a considerable amount of representation of the application as well as reasoning can be carried out using multilevel semantic nets. However, semantic nets do not have the full power of first-order logic [Ringland, G. A. and D. A. Duda, 1988, Approaches to Knowledge Representation: An Introduction, Research Studies Press Ltd. Letchworth, England: New York, John Wiley & Sons]. As a result, it may not be possible to be able to completely represent some applications. Therefore, if a complete analysis of any multilevel application has to be performed, a more powerful representation and corresponding reasoning strategies are needed.

Conceptual graphs as they are defined are not adequate to represent multilevel applications. That is, we need to develop the notion of multilevel conceptual graphs for this purpose. We will briefly discuss some of the essential points of multilevel conceptual graphs, and reasoning strategies. We assume that the reader is familiar with conceptual graphs as described in Sowa, J., 1984, Conceptual Structures: Information Processing in Minds and Machines, Reading, Mass.: Addison Wesley.

We first define the notion of multilevel conceptual graphs (MCG). A multilevel conceptual graph is a conceptual graph with security levels assigned to concept types, concepts, relationship types, and relationships. We enforce the following rules for consistency. The reasons are explained in our discussion on multilevel semantic nets.

Rule B1: If X is an instantiation of concept C, the Level(X)→Level(C).

Rule B2: If Y is an instantiation of a relationship type R, then Level(Y)→Level(R).

Rule B3: If C1 and C2 are concept types and if C1<C2, the Level(C1)→Level(C2).

A basic MCG should represent assertions associated with the multilevel application being modelled. For example, consider the assertion at the Secret level that there is a battle ship named FLORIDA which is sailing to Libya. However at the Unclassified level, the assertion states that there is a passenger ship named FLORIDA which is sailing to Greece. FIG. 14 illustrates this assertion. At the Secret level, the ship FLORIDA is the agent to the action of sailing. The event that results from the action is reaching Libya. An attribute of FLORIDA is battle. At the Unclassified level, the ship FLORIDA is the agent to the action of sailing. The event that results from the action is reaching Greece. The attribute of FLORIDA is passenger.

Negative statements as well as more complex assertions can be represented using the concept type PROPOSITION. The instances of PROPOSITION is any conceptual graph. It is represented as a box. The unary relation NOT is then inserted in front of the box to imply its negation. For example, consider the MCG shown in FIG. 14. The information presented at the Secret level conflicts with the information presented at the Unclassified level. A human analyst at the Secret level could assume that the information at the Secret level is the valid information. However, an automated analyst needs to be told that the information represented at the Unclassified level is not valid. That is, the negative information "It is not the case that there is a passenger ship FLORIDA which is going to Greece" needs to be specified. One way of representing this negative information is shown in FIG. 15.

FIG. 16 shows another use of the PROPOSITION type. Consider the Secret assertion "The captain knows that the enemy is going to attack on 6/16/90." The assertion "enemy is going to attack on 6/16/90" is represented as a instance of PROPOSITION type. This instance is Unclassified. The assertion that the captain knows something is also Unclassified. What the captain knows is Secret.

Universal statements can also be expressed by conceptual graphs. For example, the assertion "every ship is managed by a captain" is represented in FIG. 17. By a captain we mean "some captain," and should, therefore, be existentially quantified. Many conceptional structures implicitly assume existential quantification. Representing several other types of assertions is described in Sowa, J., 1984, Conceptual Structures: Information Processing in Minds and Machines, Reading, Mass.: Addison Wesley. It has also been shown that conceptual graphs can be naturally extended to represent beliefs, modalities, and tenses, among others.

Several reasoning strategies (or deduction/inference rules) have been proposed for conceptual graphs. We discuss a few of these strategies and show how inferences can be detected.

Three of the deduction rules that have been proposed are:
(i) Restriction: This rule takes a graph and replaces any of its concept nodes by a subtype concept node or by a special instance of the concept. For example, the concept type PERSON may be restricted to MAN or an instance such as John.
(ii) Joining: This rule takes two graphs with a common concept (or concept type) and joins them over this concept. Various types of joins have been proposed.
(iii) Simplifying: This rule removes duplicate relationships between two concepts (or concept types) which could possibly arise after a join operation.

Figure 18A:
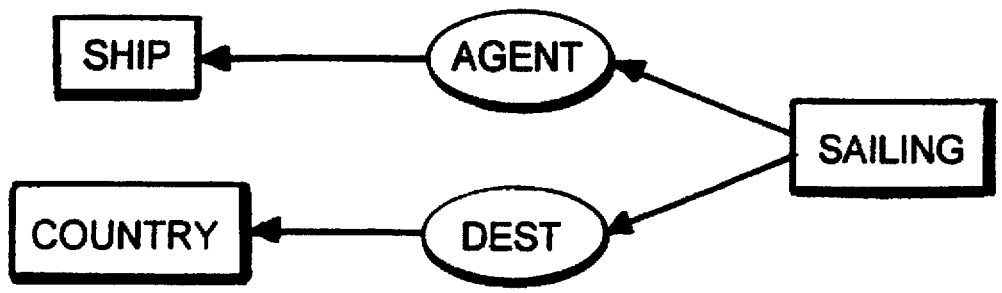
Figure 18B:
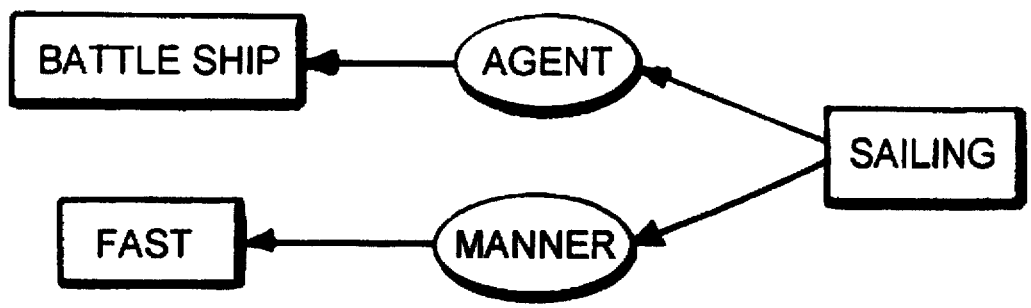
Figure 18C:
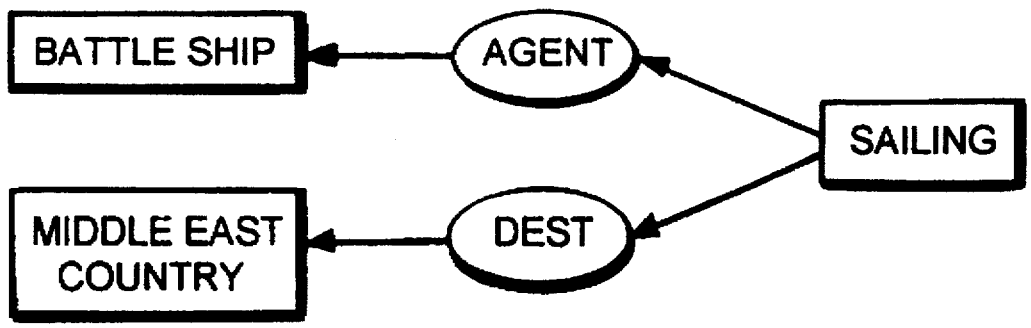
Figure 18D:
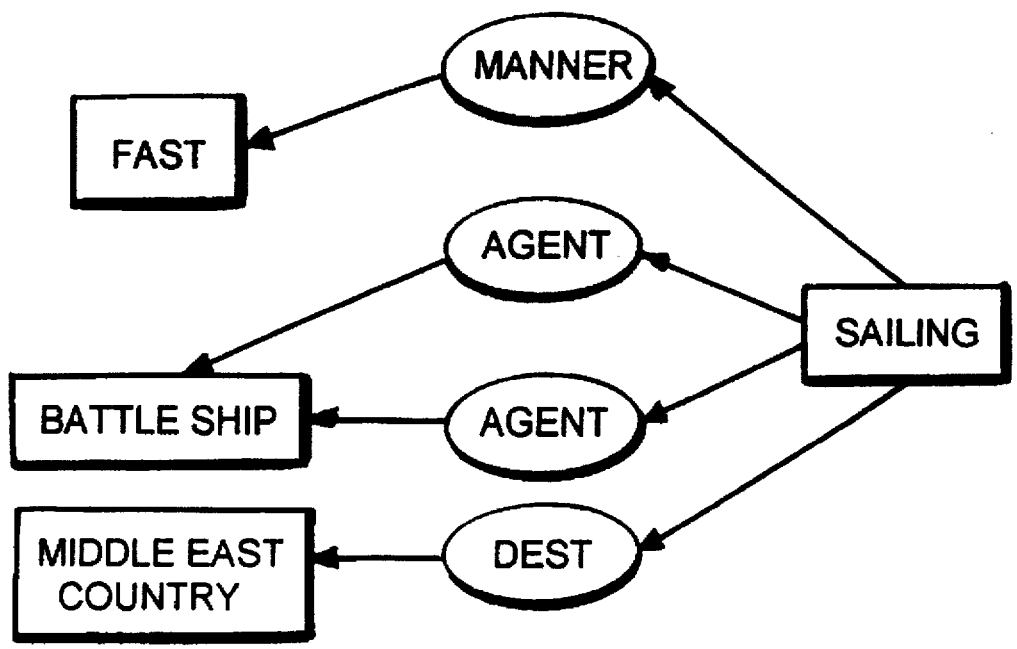
Figure 18E:
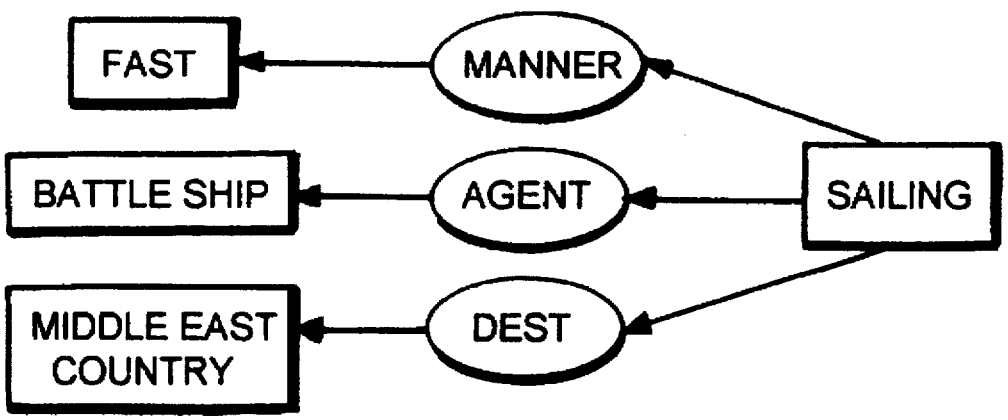

We willustrate the rules with an example. FIG. 18a states that the ship is sailing to a country. FIG. 18b states that the battle ship is sailing fast. FIG. 18c is the restriction of 18a. It states that the battle ship is sailing to a Middle East country. FIG. 18d is the join of 18b and 18c. It states that the battle ship is sailing fast to a Middle East country. FIG. 18e removes the redundant relationship between battleship and sailing.

The following security properties should be enforced whenever a deduction rule is applied:
Let C1 be a conceptual graph and C2 be the result of applying the restriction rule to C1. Any security level of the restricted concept (or concept type) in C2 must dominate the level of the original concept in C1.

Let C1 and C2 be conceptual graphs which are joined to form C3. Any concept, concept type, or relationship in C3 must have the security level of the corresponding concept, concept type, or relationship in C1 or C2. For example, if the concept type Middle East country in FIG. 18c is Secret, then this concept type in FIG. 18d must also be Secret.

Let C1 be a conceptual graph simplified to C2. Let R1 and R2 be identical relationships between the same two concepts in C1. The security level of this relationship in the simplified graph C2 is the greatest lower bound of the levels of R1 and R2.

Next we describe how these reasoning strategies can be used to detect inferences. First of all, we need a way to represent security constraints. We assume that constraints are also represented as conceptual graphs. FIG. 19a specifies a constraint which classifies the fact that ships carry weapons at the Secret level. Consider the main conceptual graph of FIG. 19b. It asserts that the Ship FLORIDA carries the weapon SPARK. This graph violates the security constraint. It can be detected as follows. Apply the deduction rules to the security constraints and see whether any portion of the main conceptual graph can be derived. If so, check whether the levels of the concepts, concept types, and relationships of the derived graph dominate the levels of the corresponding constructs in the main conceptual graph. If so, there is a security violation. In this example, the constraint is restricted by substituting FLORIDA for ship and SPARK for weapon. The agent and object relationships remain Secret. The derived graph occurs in the main conceptual graph. However, the agent and object relationships in the main conceptual graph are Unclassified. This causes a security violation.

The Expert Inference Controller

This aspect of the invention, the expert inference controller, uses various types of reasoning techniques in order to combat the inference problem. At present, we envisage XINCON to be used only by the operator, or system security officer (SSO), to detect or prevent security violations via inference, as shown in FIG. 20. In the longer term, as more developments are made in verification technology, we expect XINCON to give on-line advice to the MLS/DBMS. Although the techniques utilized by XINCON are applicable to any MLS/DBMS, we focus mainly on an MLS/DBMS based on the relational data model.

The major modules of XINCON, in addition to the database and the multilevel secure database management system, are shown in FIG. 21. They are: the User Interface (XUI), the Knowledge Manager (XKM), the Truth Maintenance System (XTMS), the Conflict/Contention Resolution System (XCCRS), and the Inference Engine (XIE) which is the heart of XINCON. Each module is discussed in more detail below, but following is a short description of each of them.

XKM is responsible for managing and structuring the knowledge base. It must also ensure the consistency of the knowledge base. Any access to the knowledge base is via XKM. It has interfaces to all of the modules of XINCON. The knowledge base stores all of the relevant information. This includes security constraints, real-world information, heuristics, and relevant information released to various users.

XUI is the interface to XINCON. It can be used for updating the knowledge base, for querying XINCON, for obtaining advice from XINCON, or for requesting XINCON to solve a particular problem. XUI is also used if XINCON needs additional information from the SSO.

XIE is the heart of XINCON. It has the potential for using a variety of inference strategies. Each inference strategy (or combination of strategies) could be executed on a separate processor for efficiency. As a minimum, XIE should be able to perform logical inferences. In our design, XIE is also capable of performing fuzzy reasoning. That is, facts and rules are assigned fuzzy values and conclusions are drawn from facts and rules using Zadeh's fuzzy logic [Zadeh, L., 1965, "Fuzzy Sets," Information and Control, Vol. 8, pp. 338–353]. XIE uses plausible reasoning when dealing with uncertainty. Note that in a multilevel environment, there could be different views of the same entity at different security levels. This means that the knowledge base could potentially have conflicting information about an entity at conceptually different security levels. Therefore XIE should be able to reason across security levels, and it handles any conflicts or uncertainties by consulting XCCRS.

XCCRS is responsible for resolving conflicts as well as determining the best choice to take when the system is presented with different options. For example, one particular reasoning strategy could potentially give results which conflict with another reasoning strategy. In such a situation, XIE would consult XCCRS to resolve the conflict. The conflict is resolved by XCCRS querying either the XKM or even the SSO if necessary. When XIE has to select between various rules XCCRS is consulted. XCCRS will determine whether a particular rule will subsume the other or whether a rule could possibly be useless. It then gives appropriate advice to XIE. XCCRS is especially critical when reasoning across security levels where it is possible to have contradictory facts at different security levels.

XTMS is the module that is responsible for maintaining the consistency of the various beliefs. Such a module is necessary for nonmonotonic reasoning. We illustrate its function with a simple example. Suppose the knowledge base includes the following information: "If CHAMPION is located in the Mediterranean and it carries explosives, then its destination is Libya," "CHAMPION is located in the Mediterranean," and "CHAMPION carries explosives." From this information, XIE would infer that "CHAMPION's destination is Libya." That is, to support the fact that CHAMPION's destination is Libya, it must be located in the Mediterranean and it must carry explosive weapons. XTMS at time t1 will be maintaining the supporting evidence for the belief that CHAMPION's destination is Libya. Suppose later at time t2 it is found that CHAMPION is not carrying explosive weapons, then XTMS must retract its support for the belief that CHAMPION's destination is Libya.

More detailed descriptions of the modules are provided in the following paragraphs. The first section describes the Knowledge Manager and presents the basic knowledge representation scheme for the invention. The second section describes the User Interface, which uses conceptual structures (in particular, semantic nets) to represent the application information in an intuitive way for the system security officer (SSO) before the information is translated for use by the Knowledge Manager. The third section describes the invention's reasoning strategies, which are performed by the Inference Engine and the Conflict/Contention Resolution System. The fourth section describes the operation of the invention's Truth Maintenance System. Finally, the last section describes three alternative approaches to implementing the invention and notes that programming it in Prolog is the preferred approach.

The Knowledge Manager and Knowledge Representation

The Knowledge Manager (XKM) is responsible for managing and structuring the invention's knowledge base. The knowledge representation scheme used by XINCON is a combination of frames and rules. Frames are ideal to represent structured knowledge. The inheritance mechanism in frames is a powerful one which enables the representation of generic entities, as well as instantiations of the generic entities. The frames used to represent the knowledge are called knowledge frames. Each knowledge frame describes a generic entity or a specific instance of a generic entity. A knowledge frame has many slots associated with it. Each slot describes some property of the entity represented. Alternatively, it could have rules or security constraints associated with it.

Every knowledge frame has one slot which specifies the security level at which the knowledge frame is true. That is, the slot specifies the security level assigned to the knowledge frame. The security level is necessary because entities can have different information at different security levels. FIG. 22 shows Unclassified and Secret knowledge frames which have information on the ship CHAMPION. Since CHAMPION is a ship, it inherits information from the knowledge frame which has information on the generic entity SHIP. Each knowledge frame also has real-world information and security constraints associated with it. Note that whenever the word "inherit" is used for a slot, it means that the value for that slot is inherited from the knowledge frame representing the generic entity of the specific instance.

In addition to representing knowledge as frames, rules are also used to represent some of the knowledge such as constraints, real-world data, and conflict resolution. The rules could be specified as Horn clauses, in which case the techniques developed for maintaining the consistency and completeness of Horn clause logic programs could be used for the rules also. Rules could also be specified as clauses of the Logical Data Language developed at MCC [Naqvi S., and S. Tsur, 1989, "A Logical Language for Data and Knowledge Bases," Computer Science Press, New York] or as statements of the constraint language developed in the Cyc project [Lenat, D., and R. Guha, 1989, "Building Large Knowledge-Based Systems," Addison Wesley, Mass.] at MCC. (Much of our work on knowledge-based inference control has been influenced by the Cyc project. Note that there are also other ways to represent rules and constraints.) Each rule is assigned a security level.

Some knowledge-representation approaches allow certain types of security violations via inference to be detected regardless of the content of the knowledge base. Application independent security properties (or constraints) can then be enforced to prevent such security violations. These constraints depend on the structure and not on the content of the knowledge base. Below, we discuss rule and frame-based representation schemes and discuss possible application-independent security properties. For a more detailed discussion of the properties of frames, rules, and transforming rules to frames and frames to rules we refer to Thuraisingham, B., 1989, From Frames to Rules and Rules to Frames, AI-EXPERT, Vol. 4, #2.

Rule-Based Representation

Many of the knowledge-based systems discussed in the literature use rules to represent the knowledge. Such systems are popularly known as production rule-based systems. Thus, a production system consists of a database which describes facts associated with the application (note that this database is different from the multilevel database which we are trying to protect), a rule-base which consists of a set of rules, and a rule interpreter which selects the rules that have to be applied and processes these rules.

A rule is of the form:

"If CONDITION then ACTION"

where CONDITION is a boolean expression which must be evaluated to TRUE for the rule to be applied. The ACTION part of the rules has different interpretations. It could either be a list of commands that should be carried out if the CONDITION evaluates to TRUE or it could be a boolean expression which evaluates to TRUE whenever the CONDITION evaluates to TRUE. CONDITION is evaluated by either querying the database or by getting additional information from the SSO. As a result of applying a rule, it is possible for facts to be deduced, old facts to be deleted, or facts to be modified.

Since rules have no structure, there are no application independent security properties enforced on rule bases.

Frame-Based Representation

Although rules are adequate to represent various types of knowledge, it is not possible with them to structure the knowledge as depicted by the real world. For example, consider the following rule base:

R1: CHAMPION's destination is Japan
R2: OHIO's destination is Persian Gulf
R3: CHAMPION is a passenger ship
R4: OHIO is a war ship
R5: CHAMPION's mission is Cruise
R6: OHIO's mission is Iraq Crisis Rules R1, R3 and R5 give information about CHAMPION, while rules R2, R4, and R6 describe OHIO. However, with rules, there is no structure where all the information about CHAMPION (or OHIO) could be represented with this structure. One could cluster the rules into two groups; one group consisting of rules describing CHAMPION while the other consisting of rules describing OHIO. These clusters are artificially created and are not part of the rule-based representation scheme.

The slot-and-filler representation schemes were developed to overcome this inadequacy of rule-based representation. A popular slot-and-filler representation scheme is the frame-based representation. A frame is a structure that represents an entity type in the real world such as a person type, a vehicle type, or a building type. A frame consists of slots which hold values. When all of the slots are filled with values, then the frame gets instantiated. That is, an instance of the frame is created. For example, in a SHIP frame with a slot name, destination, type, and mission, if the values (OHIO, Persian Gulf, war-ship, Iraq crisis) are given to the respective slots, then an instance of SHIP is obtained. The value of a slot could be an integer, string, boolean, or even a pointer to another frame instance. (This discussion assumes a generic frame system as given in Frost R., 1986, Introduction to Knowledge-Base Management Systems, Collins, London.)

Other constructs in a frame-based representation scheme include generic properties, default values, slot constraints, daemons, and links. Each of these constraints is described below.

Generic properties are properties that all of the instances of a frame must satisfy. For example, "has weight" slot of all instances of the SHIP frame has the value "Yes". This is a generic value.

Default values are used for a slot if no other value is known. For example, the "number of hours in operation per week" slot in a SHIP frame has the default value 40. This means that unless another value is specified for this slot for a SHIP instance, it is assumed that it is in operation 40 hours a week.

Slot constraints are constraints associated with a slot. For example with the age slot in a SHIP frame, one could have a constraint "0←age←20". A daemon is a procedure attached to a slot. This procedure is invoked if the slot constraint is violated. For example, if the age of a ship is 25, then the constraint is violated. The daemon procedure associated with this slot will specify the actions to be taken.

Links join two or more frames. For example, a slot in the frame SHIP may be linked to a frame CAPTAIN to represent the "ship-captain" relationship. This link is a relationship link. Another type of link is the IS-A link which describes the entity/sub-entity relationship. For example, the link from a SHIP frame to a WARSHIP frames is an IS-A link, as every war ship is a ship. A collection of IS-A links form an IS-A hierarchy.

In addition to the above constructs, XINCON has additional slots for the security level of a frame and for the associated security constraints.

Since frame-based representation has structure, application independent security properties could be enforced. These properties include the following:

Property: The security level of a generic frame must be dominated by the security level of all the instance frames associated with the generic frame.

For example, if the SHIP frame is Secret, then it does not make sense to classify a ship instance frame at the Unclassified level. That is, each ship instance frame must be classified at least at the Secret level.

Property: The security level of a sub-entity frame must dominate the security level of an entity.

For example, if a SHIP frame is Secret, then it does not make sense to classify a WARSHIP frame at the Unclassified level.

The security level of a link (IS-A or relationship) which connects two frames must dominate the security level of the frames associated with the link.

For example, it does not make sense to classify the link between SHIP and WARSHIP at the Unclassified level, if either SHIP or WARSHIP are classified at the Secret level.

The application independent security properties described above are enforced by the Knowledge Manager (XKM). This means that if any of the security properties are not satisfied when the knowledge base is updated, XKM detects that a potential security violation via inference might occur and informs the SSO.

The User Interface and Knowledge Acquisition

Knowledge acquisition is the process of gathering the data and knowledge and representing it in a way that can be processed by the Knowledge Manager. In other words, the application information, as well as the input from the MLS/DBMS (via the SSO), must be transformed into rules and frames so that XKM can process the data/knowledge. The knowledge acquisition process is the responsibility of the knowledge engineer. (Note that the knowledge engineer is different from the domain expert. He has to extract the knowledge from the domain expert and represent it. For our problem, the applications specialist (or the SSO) is the domain expert. The knowledge engineer extracts the information on the multilevel implementation and represents it.) Tools are needed to bridge the semantic gap between the application specification and the knowledge base.

The use of conceptual structures to represent multilevel applications is an approach to bridging this gap. Conceptual structures represent information in a way that allows the knowledge engineer to enter and analyze the information present. Then the conceptual structures can be transformed into rules and/or frames so that they can be analyzed by the XKM. As an example of how a semantic net can be translated into a frame representation, FIG. 23 shows the semantic net of FIG. 3 as a collection of frames. The tools for making this transformation are part of the User Interface (XUI).

The use of conceptual structures in analyzing security violations can also be more extensive. As an alternative to the translation of the structures in rules or frames, the operator can use the conceptual structure representations themselves as incorporated in the user interface to detect security violations as described above.

The Inference Engine and Reasoning Strategies

The Inference Engine (XIE) provides the reasoning capability for the invention. It uses rule-based reasoning, frame-based reasoning, and fuzzy reasoning. In addition, it reasons across security levels and under uncertainty. In this section, we discuss the various types of reasoning. Rule-based reasoning A method for the rule interpreter to apply rules is as follows:

(i) Evaluate the CONDITION in each rule. If none of the conditions are satisfied, then terminate with failure.

(ii) Else, carry out the ACTION specified in each rule where the CONDITION evaluates to TRUE. If the goal is achieved, then terminate with success.

(iii) Else, go back to step (i).

This method of rule application is the data driven (or forward chaining) approach. In another method called the goal driven (or backward chaining) approach, instead of examining all the rules, only the rules relevant to the goal are selected. This method is as follows:

(i) Examine the rules where the goal is included in the ACTION part.

(ii) Evaluate the CONDITION part in each of these rules.

(iii) Otherwise, the CONDITION part is made the new goal and the process is repeated until there are no more relevant rules for a goal. At this point, terminate with failure.

A third method, which is a hybrid of the data driven and goal driven approaches, has also been proposed.

We illustrate how security violations via inference may be detected with a simple example. Consider an Unclassified rule base consisting of the following two rules:

R1: CHAMPION is a warship
R2: If X is a warship, its mission is Secret
R3: CHAMPION's mission is Iraq Crisis Suppose an unclassified user is given the information R1 and R2. Then this release of information must also be recorded in the knowledge base (by XKM). XIE could reason as follows: since CHAMPION is a warship, using rule R2, its mission is Secret. Since CHAMPION's mission is the Iraq crisis, this mission must be kept Secret. Since CHAMPION's mission has been given to an Unclassified user, a security violation has occurred.

Frame-Based Reasoning

The problem solving technique used by frame-based systems is "matching". Given some information about an entity in the real world, the system will try to match the values associated with the entity with the slot values of frames. As stated by Frost [FROS86], "matching" results in the following deductive inferences in frame-based systems:

(i) when a sufficient match is made, the system assumes the existence of an instance of the frame.

(ii) when a sufficient match is made, the system can infer that the instance has the (readily inherited) generic properties associated with the frame.

Another type of inference in frame-based systems is analogical reasoning. For example, given the statement "X is like Y", from the values in slots for Y, some information about X can be inferred.

We illustrate how security violations via frame-based inference could occur with a simple example. Consider an Unclassified frame which describes all of the properties of a passenger ship named CHAMPION. Suppose OHIO is another ship and there is a security constraint that classifies all properties of OHIO at the Secret level. There is also an Unclassified rule which states that OHIO and CHAMPION are similar. From this rule, an Unclassified user could infer some of the Secret properites of OHIO. Therefore, one should classify the fact that OHIO and CHAMPION are similar at least at the Secret level. (Another option is to specify that certain properties are not inherited.)

Fuzzy Reasoning

Fuzzy reasoning usually extends rule-based reasoning by assigning fuzzy values (also called CHI values) to the rules. Fuzzy reasoning must obey the following rules of fuzzy logic.

If A and B→C, then CHI(C)=minimum (CHI(A), CHI(B));

If A or B→C, then CHI(C)=maximum (CHI(A), CHI(B));

If NOT A→c, then CHI(C)=1−CHI(A).

The first rule states that if A and B imply C, then the CHI value of C is the minimum of the CHI values of A and B. The second rule states that if A or B imply C, then the CHI value of C is the maximum of the CHI values of A and B. The third rule states that if NOT A implies C, then the CHI value of C is 1 minus the CHI value of A.

Concepts in fuzzy reasoning can be used to handle security violations via inference. FIG. 24 describes a fuzzy knowledge base. For each assertion, there is a CHI value associated with it. For example, the fact that CHAMPION is a ship in the Persian Gulf has a CHI value of 1.0 associated with it. The fact that a ship in the Persian Gulf is a warship has a CHI value of 0.9 associated with it. The fact that CHAMPION is involved in the mission Iraq Crisis has a CHI value of 0.8 associated with it. The fact that Iraq Crisis is a failed mission has a CHI value of 0.1 associated with it. One can also deduce new fuzzy information from existing fuzzy information. Consider the following rule:

SHIP(X,Y) and WARSHIP(Y)→CARRY-EXPLOSIVES (X)

This rule states that if X is a warship, then it carries explosives. The CHI value for "a ship carries explosives" is computed from the CHI values for "X is a SHIP in Y" and "any ship in Y is a warship". Furthermore, the computation also depends on the assignment of CHI values for the AND operator. Assuming that the rule itself is assigned a CHI value of 1.0, with the above definitions, it can be shown that the CHI value for "CHAMPION carries explosives" is 0.9.

Fuzzy reasoning may be used to prevent security violations via inference. Consider the knowledge-base described in FIG. 24. Let the content constraint be as follows:

Any SHIP engaged in a failed mission is Secret.

First, it must be decided whether a ship must be engaged in a failed mission with a CHI value of 1 in order to be classified as Secret. Let us assume that the CHI value associated with the constraint should be greater than 0.0. That is, if a ship is engaged in a failed mission with a CHI value greater than 0.0, then it is classified at the Secret level.

Note that 0.0 is not a fixed value. This value could be anywhere between 0.0 and 1.0. The security constraint is specified as follows:

Any SHIP engaged in a failed mission with a CHI value of greater than 0.0 is Secret.
This constraint is expressed by the following rule:
Level (X.Secret) ←CHI (REL(X))>0.0;
where REL(X) is true if X is in SHIP and X is engaged in a failed mission. REL(X) is defined by the following rule:
REL(X) ←SHIP(X,-) and MISSION(X,Y) and FAIL(Y). (Note that '-' is a variable that is not relevant to the query.)

Note that the security constraint itself could be assigned a CHI value. To simplify the discussion, we assume that the CHI value of the constraint is 1.0.

XIE will reason as follows. Examining the constraint, it will attempt to compute the CHI value for REL(X). First the query SHIP(X,-) will be evaluated using resolution. The answers to the query will be;

| | |
|---|---|
| CHAMPION | 1.0 |
| OHIO | 1.0 |
| FLORIDA | 1.0 |

Next, XIE will evaluate the query SHIP(X,-) and MISSION(X,Y) for each of the three ships. The answer to this query will be:

| | |
|---|---|
| (CHAMPION, Iraq crisis) | 0.9 |
| (OHIO, Korean war) | 0.7 |
| (FLORIDA, Vietnam) | 0.8 |

Finally, XIE will evaluate the query FAIL(Y) for each mission Iraq crisis, Korean war, and Vietnam. The result of the query will be:

| | |
|---|---|
| Iraq crisis | 0.1 |
| Korean war | 0.5 |
| Vietnam | 0.9 |

The value for REL(X) for the three ships are the following:

| | |
|---|---|
| CHAMPION | 0.1 |
| OHIO | 0.5 |
| FLORIDA | 0.9 |

So, XIE now determines that all three ships are sensitive. It should inform the SSO to upgrade the security levels of these three ships.

Reasoning Across Security Levels

As stated above, XIE should be able to reason across security levels. In our design, XIE reasons as follow. In the example of FIG. 25, when XIE is reasoning with respect to users at the Unclassified level (that is when it attempts to detect the unauthorized inferences that the Unclassified users could draw), it considers the knowledge frame of CHAMPION at Unclassified security level. If it is reasoning with respect to users at the Confidential level, then it still considers the knowledge frame at the Unclassified level, as there is no knowledge frame on CHAMPION at the Confidential level. If it is reasoning with respect to users at the Secret level, then it could do one of the following:

Consider only the knowledge frame on CHAMPION at the Secret level.
Consider both the knowledge frames on CHAMPION at the Unclassified and Secret levels.
Consult with XCCRS as to which frame to consider.

A simple solution would be to take the first action. That is, assume that information at level L is more accurate than the information at level L-1. In realty, however, information at a lower level could be more accurate. For example, information at a lower level could be more current than the one at the higher level. XCCRS could resolve the conflicts either by (i) checking the knowledge base for appropriate conflict resolution rule, (ii) querying the user to give more up-to-date information, (iii) in the absence of appropriate information, making plausible guesses based on recent experiences, or (iv) reasoning using the rules of a theory such as plausibilty theory.

The use of plausibility theory to cope with uncertainty is described in more detail in the next subsection.

Coping with Uncertainty Using Plausible Reasoning

As described above, in a multilevel environment, it is possible for users at different security levels to have different views of the same entity. This causes additional uncertainty as users at a higher level have different sources of information available to them. One theory that is particularly appealing for reasoning across security levels is plausibility theory. Such a theory deals with the situation where the sources of information are imperfect (or unreliable). In a multilevel world, one could argue that sources of information at different security levels could have different reliability values. It does not necessarily mean that higher level sources of information have higher reliability values. Reliability values could also depend on the integrity of the source However the reliability values may be assigned, rules of plausibility theory can be used to reduce a set of assertions and rules to the most plausible set. We will illustrate reasoning under uncertainty using rules of plausibility theory with an example.

Consider FIG. 25. It illustrates reliability values assigned to different sources. Although it may not be necessarily true, in this example, we assume that users cleared at level "Beyond-Top Secret" are most reliable. That is, the reliability value for these users is 1.0. The assertions at this level are: R→S, S, S→NOT P. Similarly, the figure shows the reliability values for the other security levels as well as the assertions that are true at these levels. Any assertion that is true at a level L is assigned the plausibility value equal to the reliability value at L. That is, the assertion S at level Beyond-Top Secret is assigned the plausibility value 1.0. At the highest level, a user has all of the assertions available to him. Some of these assertions are contradictory. The problem is to find the most consistent set of assertions that are noncontradictory at this level. We describe one way of finding such a set. (We have obtained this example from Frost[Frost R., 1986, Introduction to Knowledge-Base Management Systems, Collins, London]. We have, however, modified it slightly so that it is relevant to our problem. For a detailed discussion on Rescher's plausibility theory we refer to Frost.)

Let CS be the set which consists of all of the assertions in FIG. 25. Next, we form all the possible consistent sets (using algorithms of plausibility theory as given in Frost). The consistent sets are the following (for a discussion on the method used to obtain these consistency sets we refer to Frost):

(i) CS1=CS-[NOT P, NOT S, NOT Q and R,S→NOT P]
(ii) CS2=CS-[NOT S, P AND Q, NOT Q AND R]

(iii) CS3=CS-[NOT S, P AND Q, Q AND R]
(iv) CS4=CS-[NOT P, S, NOT Q AND R, R→S]
(v) CS5=CS-[NOT P, S, NOT Q AND R, Q AND R]
(vi) CS6=CS-[S, P AND Q, NOT Q AND R, R→S]
(vii) CS7=CS-[S, P AND Q, NOT Q AND R, Q AND R]
(viii) CS8=CS-[S, P AND Q, Q AND R, Q OR S, R→S]

Since the sets CS1, CS4, CS6, and CS8 have eliminated assertions with plausibility value of 1.0, these sets are ignored. The remaining sets are CS2, CS3, CS5, and CS7. Amongst these remaining sets, the set which has eliminated assertions with the lower plausibility values is CS2. That is, at the highest level, the most plausibly consistent set that one could consider is the set CS2.

Note that different consistent sets are obtained at different levels as the number of available assertions decrease with lower security levels.

The Truth Maintenance System

The Truth Maintenance System (XTMS) is the module of XINCON that is responsible for maintaining the consistency of the various beliefs. Such a module is necessary for nonmonotonic reasoning. In this section we discuss the essential points in extending Doyle's Truth Maintenance System (TMS) to reason in a multilevel environment. (Doyle's TMS [Doyle, J., "A Truth Maintenance System," Artificial Intelligence Journal, Vol. 12, pp. 231–272]is based on the nonmonotonic logic developed in McDermott and Doyle, J., 1980, "Nonmonotonic Logic," Artificial Intelligence Journal, Vol. 12. The discussion that we have given here extends the discussion on truth maintenance given in Frost R., 1986, Introduction to Knowledge-Base Management Systems, Collins, London to a multilevel environment. Note that several variations of Doyle's truth maintenance system have been proposed. An example is deKleer's assumption-based truth maintenance [deKleer, J., 1986, "Assumption-Based Truth Maintenance," Artificial Intelligence Journal, Vol. 28] and MCC's Proteus [Russinoff, D., 1989, (Editor: W. Kim, and F. Lochovsky), "Proteus: A Frame-Based Nonmonotonic Inference System," Object-Oriented Concepts, Databases, and Applications, ACM Press] system.)

In XTMS, statements of belief are called 'nodes.' Each node (or statement of belief) is assigned a security level. If a node is assigned a security level L, then it can be IN or OUT with respect to any level ≧L. A node is IN with respect to L if it is believed to be true at L. Otherwise, the node is OUT. Each node at level L has a set of justifications linked to it with respect to each security level that dominates L. Each justification at a level L*≧L represents a justification representing one way in which the node (i.e., the belief which corresponds to it) may be true. If a justification at level L* is valid, then, unless that justification is explicitly made invalid at level L (L is the least level which dominates L*), it is also assumed valid at level L*. A node at level L is IN with respect to level L*≧L if it has at least one justification valid at L*. If all justifications at level L* are not valid, then the node is OUT with respect to L*.

Doyle's TMS considers two kinds of justifications: support list justifications and conditional proof justifications. We only discuss support list justifications for an XTMS. Future work should include adapting conditional proof justifications for a XTMS.

In the case of support list justifications, the justification at level L*≧L of a node N at level L consists of a support list which identifies those nodes which are required to be IN with respect to L* and those nodes which are required to be OUT with respect to L* in order for that particular justification of N to be valid with respect to L*.

We illustrate support list justification with an example. In this example, we assume that there are only two security levels, Unclassified (U) and Secret (S). FIG. 26 shows the XTMS nodes and a justification at the Unclassified level. This figure is interpreted as follows:

The nodes are numbers 1 through 4. Each node has the following assertion or belief:

Node 1 has the assertion "CHAMPION is a ship." This assertion has the status IN and does not have any justifications associated with it.

Node 2 has the belief "CHAMPION sails to Japan." In order for this belief to be IN, node 1 must be IN and node 3 must be OUT. Node 1 is IN. We will see that node 2 is OUT. Therefore, Node 2 is IN. That is, CHAMPION sails to Japan is consistent with everything that is believed with respect to the Unclassified level.

Node 3 has the belief "CHAMPION is not a passenger ship." In order for this belief to be true, node 4 must be IN. We will see that node 4 is OUT. Therefore, Node 3 is OUT.

Node 4 is a previous assertion "CHAMPION carries explosives." It has the status OUT because it must have been retracted earlier.

FIG. 27 shows the assertions, beliefs, and justifications at the Secret level. Here there are two justifications that could possibly be associated with a node. This table is interpreted as follows: There are four unclassified nodes (i.e., beliefs) as in the Unclassified world and one Secret node.

Node 1 has the assertion ("CHAMPION is a ship." This assertion has the status IN and does not have any justifications associated with it. Note that node 1 is assigned the Unclassified level. Its status has not changed from the Unclassified world.

Node 2 has the belief "CHAMPION sails to Japan." In order for this belief to be IN, node 1 must be IN and node 3 must be OUT. Node 1 is IN. We will see that node 2 is also IN. Therefore, Node 2 is OUT. That is, CHAMPION sails to Japan is not consistent with everything that is believed with respect to the Secret level. Note that node 2 is assigned the Unclassified level. Its status has changed from the Unclassified world.

Node 3 has the belief "CHAMPION is not a passenger ship." In order for this belief to be true, either node 4 must be IN or node 5 must be IN. We will see that node 5 is IN. Therefore, Node 3 is IN. That is, "CHAMPION is not a passenger ship" is consistent with everything that is believed with respect to the Secret level. Note that node 3 is assigned the Unclassified level. Its status has changed from the Unclassified world.

Node 4 is a previous assertion "CHAMPION carries explosives." It has the status OUT because it must have been retracted earlier. Note that node 4 is assigned the Unclassified level. Its status has not changed from the Unclassified world.

Node 5 is an assertion "CHAMPION is a warship." It has the status IN. Note that node 5 is assigned the Secret level and is, therefore, not visible at the Unclassified level.

If at a later time the assertion that "CHAMPION is not a warship" is retracted in the Secret world, then the status of node 5 becomes OUT. This would change the status of node 2 to be OUT. This would, in turn, change the status of node 2 to be IN. It should also be noted that an XTMS does not create justifications. The justifications are provided by XKM to XTMS. The XTMS maintains a consistent set of beliefs with respect to all security levels.

Implementation Issues

The Expert Inference Controller could be implemented using a high level shell, a conventional language such as C, or an AI language such as LISP or Prolog. In this section, we first provide an overview of the three approaches and discuss our desired approach of implementing XINCON in Prolog. Then we discuss the essential points in implementing XIN-CON in Prolog.

Overview of the Approaches

The least complex way to implement an expert system would be to use an existing expert system shell. Commercial off-the-shelf expert system shells such as G2 (product of Gensym Inc.) are now available. Many of these shells handle knowledge bases represented as frames and rules. Furthermore, some of them are designed for real-time applications. While using a commercial shell has obvious advantages, such as reduced implementation time and effort, it may not be tailored to solve special applications. That is, one has to contend with the reasoning strategies that could be quite complex to implement. Also, one would need the source code of the shell to make these enhancements. Therefore, unless we can find a shell that can specifically handle the reasoning strategies of XINCON, this is not a desired approach.

The second approach is to implement XINCON in a conventional language such as C. While implementation in C has obvious advantages with respect to efficiency, we believe that some of the complex reasoning strategies and data structures would be difficult to implement. This belief is based on our experience with a simple inference controller prototype that we implemented in C [Ford, W. R., J. O'Keefe, and B. Thuraisingham, August 1990, Database Inference Controller: An Overview, Technical Report MTR10963 Vol. 1, The MITRE Corporation]. (In that prototype, a commercial MLS/DBMS is augmented by a deductive manager. The inference engine was implemented entirely in C. It handles simple logical inferences that users could utilize to draw unauthorized inferences. The components of the deductive manager are the query modifier (which preforms query modifications), the constraint manager (which manages the knowledge base), the response processor (which sanitizes the response), and the release database updater (which updates the knowledge base with information released to users). The implementation of the deductive manager consisted of about 8500 lines of code. The modules which handle conflicts and maintain the consistency of beliefs were not implemented. In addition, the inference engine did not handle any complex inference strategies. The knowledge consisted of just the security constraints represented as Horn clauses.)

The third approach is to use an AI language such as Lisp or Prolog. While both languages have their advantages and disadvantages, since we are dealing with handling the inference problem in a relational database management system, we believe that the preferred language is Prolog. This is because there is a natural relationship between the Prolog database model and the relational data model. In fact a relational database is a Prolog program. Prolog interfaces to several relational database systems are being developed. (See the discussion is Li, D., 1984, A Prolog Database System, Research Studies Press, John Wiley and Sons, London) Furthermore, all of the essential features of XINCON, such as reasoning under uncertainty, truth maintenance, and handling frame and rule-based representations, can be implemented in Prolog. For these reasons, we believe that Prolog is the most appropriate language to implement XINCON. (It has been suggested by Penny Chase that since Prolog has built-in backward chaining, it can be used for the inference engine. If one were to choose a language such as LISP, the inference strategy has to be implemented by the Programmer. However, Chase states that for performance reasons one might want to re-implement the system in a language such as LISP. We feel that much work has been done in recent years especially by the ICOT project ["ICOT Project" 1987, New Generation Computing Journal, Vol. 5] on developing special purpose hardware and software to improve the execution speed of logic programs. So implementing XINCON in Prolog may not be a disadvantage with respect to performance.)

Implementing XINCON in Prolog

In this section, we describe the essential points in implementing XINCON in Prolog. Much of the information has been obtained from implementing expert systems in Prolog as described in Merritt, D., 1989, Building Expert Systems In Prolog, Springer Verlag, New York. We assume that the reader has knowledge of the basic constructs of Prolog as given in Clockskin W., and C. Mellish, 1984, Programming in Prolog, Heidelberg, Germany: Springer Verlag.

Prolog has a built-in backward chaining inference engine which can be used directly for some types of reasoning. For example, the goal driven reasoning strategy of rule-based systems can be implemented directly in Prolog. The data driven (or forward chaining) reasoning of rule-based systems have been used in a number of expert systems. Prolog can be used to implement forward chaining by first implementing each rule as a Prolog term and using Prolog's built-in backtracking and pattern matching (unification) strategy for rule selection. Prolog has also been extended to handle certainty factors and fuzzy values. For example, a Prolog inference engine has been modified to handle fuzzy values. Such a modified version of Prolog has been called Fuzzy Prolog in the literature [Martin T., et al., 1987, "The Implementation of Frolog-A Fuzzy Prolog Interpreter," Fuzzy Sets and Systems, Vol. 23]. (Fuzzy reasoning in XINCON could be implemented using a language like Fuzzy Prolog.)

Frame systems can also be implemented in Prolog. As stated in Merritt [Merritt, D., 1989, Building Expert Systems In Prolog, Springer Verlag, New York], there are two issues here. The first is the design of constructs for accessing the frame system and the second is the design of the internal data structure used to hold the frame information. Constructs for accessing the frame system include additional predicates such as "get-frame" to retrieve attribute values for a frame, "add-frame" to add or update attribute values for a frame, and "del-frame" to delete attribute values from a frame. Designing data structures to hold information in a frame amounts to defining predicates for the frame names with attributes representing the slots of the frames. Finally, the frame-based Prolog representation must be integrated with the mechanisms for forward chaining and fuzzy reasoning in order to implement XINCON. The techniques proposed in Merritt which integrate frames with forwards chaining could be used for this purpose.

Although the implementation of a truth maintenance system in Prolog is not addressed in Merritt, from a preliminary investigation we feel that such a system can be implemented in Prolog. On the other hand, Prolog-based systems such as MCC's LDL [Naqvi S., and S. Tsur, 1989, "A Logical Language for Data and Knowledge Bases," Computer Science Press, New York] have utilized LISP-based truth maintenance systems such as Proteus [Russinoff, D., 1989, (Editor: W. Kim, and F. Lochovsky), "Proteus: A Frame-Based Nonmonotonic Inference System," Object-Oriented Concepts, Databases, and Applications, ACM Press]. Such a TMS XINCON implemented mostly in Prolog.

For a complete and detailed discussion on implementing a knowledge-based system such as XINCON in Prolog, we refer to [MERR89].

What is claimed is:

1. Apparatus for detecting security violations by inference in a multilevel database application, comprising:

a module whose design utilizes
    a) conceptual structures for representing the multilevel database application in which the conceptual structures comprise a collection of nodes to represent the entities of the application and links to represent the relationships between the entities, and
    b) first methods for reasoning with the conceptual structures, whereby security violations in the application are detected by inference and a modified representation of the multilevel database application is produced;

a multilevel secure database management system that manages a multilevel database which stores the modified representation; and an expert system for reasoning with the modified representation and with information released by the multilevel secure database management system to the expert system, whereby additional security violations in the application are detected by inference;
    wherein the conceptual structures of the module comprise multilevel semantic nets and multilevel conceptual graphs, said multilevel semantic nets and multilevel conceptual graphs being derived from semantic nets and conceptual graphs by second methods, and the first methods comprise techniques for reasoning with multilevel semantic nets and multilevel conceptual graphs; and
    wherein the multilevel semantic nets comprise nodes and links at a plurality of security levels, the multilevel conceptual graphs comprise concepts and relationships at a plurality of security levels, and the first methods further comprise techniques for reasoning with the nodes and links and with the concepts and relationships.

2. Apparatus of claim 1 wherein the expert system comprises:

a knowledge base which represents information as frames and rules, said information including
    a) the modified representation of the multilevel database application,
    b) information from the multilevel database, and
    c) activities of the multilevel secure database management system;

a knowledge manager for managing the knowledge base;

a truth maintenance system to maintain the consistency of the frames and rules of the knowledge base;

an inference engine which reasons with the information of the knowledge base using third methods, whereby the additional security violations are detected by inference;

a conflict and contention resolution system for resolving conflicts in the reasoning process of the third methods; and a user interface which provides an interface between a user, the knowledge manager and the inference engine.

* * * * *